US006347544B1

(12) United States Patent
Hada et al.

(10) Patent No.: US 6,347,544 B1
(45) Date of Patent: Feb. 19, 2002

(54) CONTROL METHOD FOR GAS CONCENTRATION SENSOR

(75) Inventors: Satoshi Hada; Eiichi Kurokawa, both of Kariya; Toshiyuki Suzuki, Handa; Tomoo Kawase, Nagoya; Satoshi Haseda, Okazaki, all of (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/064,163

(22) Filed: Apr. 22, 1998

(30) Foreign Application Priority Data

Apr. 23, 1997 (JP) .......................................... 9-106103
Apr. 2, 1998 (JP) .......................................... 10-089619

(51) Int. Cl.[7] .......................................... G01N 27/00

(52) U.S. Cl. .................... 73/23.32; 436/143; 204/406; 204/408; 123/697; 123/693

(58) Field of Search ........................ 436/143; 204/406, 204/408; 123/697, 693; 73/23.1; 422/83

(56) References Cited

U.S. PATENT DOCUMENTS 4,419,190 A 12/1983 Dietz et al.
4,543,176 A 9/1985 Harada et al.
5,492,612 A * 2/1996 Kennard, III et al. ...... 204/429
5,668,301 A * 9/1997 Hunter ..................... 73/23.2
5,772,735 A * 6/1998 Sehgal et al. ................ 95/45
6,120,677 A 9/2000 Yamada

FOREIGN PATENT DOCUMENTS

JP A 4-24657 4/1992

* cited by examiner

*Primary Examiner*—Jill Warden
*Assistant Examiner*—Brian Sines
(74) *Attorney, Agent, or Firm*—Nixon & Vanderhye PC

(57) ABSTRACT

An A/F signal proportional to an oxygen concentration in the exhaust gas from an internal combustion engine is output upon application of a voltage based on an instruction from a microcomputer. At the time an element resistance is detected, a bias instruction signal Vr from the microcomputer is converted by a D/A converter 21 to an analog signal Vb. An output voltage Vc obtained by removing high frequency components from the analog signal Vb through an LPF 22 is input to a bias control circuit 40. During this time period in which the element resistance is detected, an accurate A/F signal is not output. Therefore, the A/F signal that has theretofore prevailed is held by a Sample/Hold circuit 70 to thereby prevent the use of an erroneous A/F signal. Namely, at the time of detecting the element resistance, the detected value of the oxygen concentration is prevented from becoming abnormal. As a result, an accurate A/F control can be executed using the detected element resistance.

16 Claims, 24 Drawing Sheets

FIG. 28
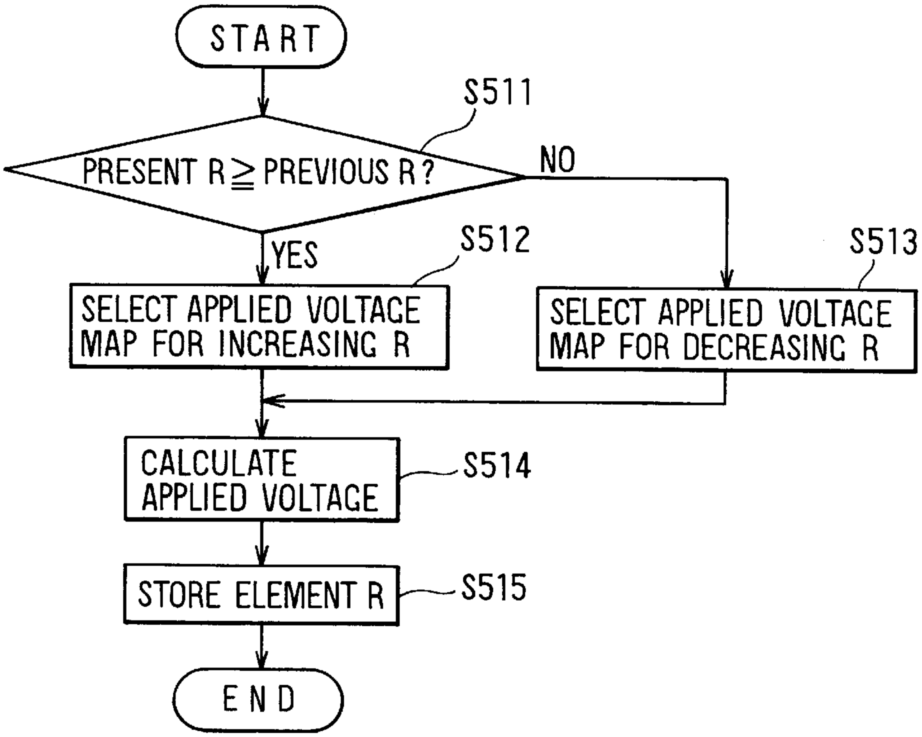
FIG. 32A
FIG. 32B
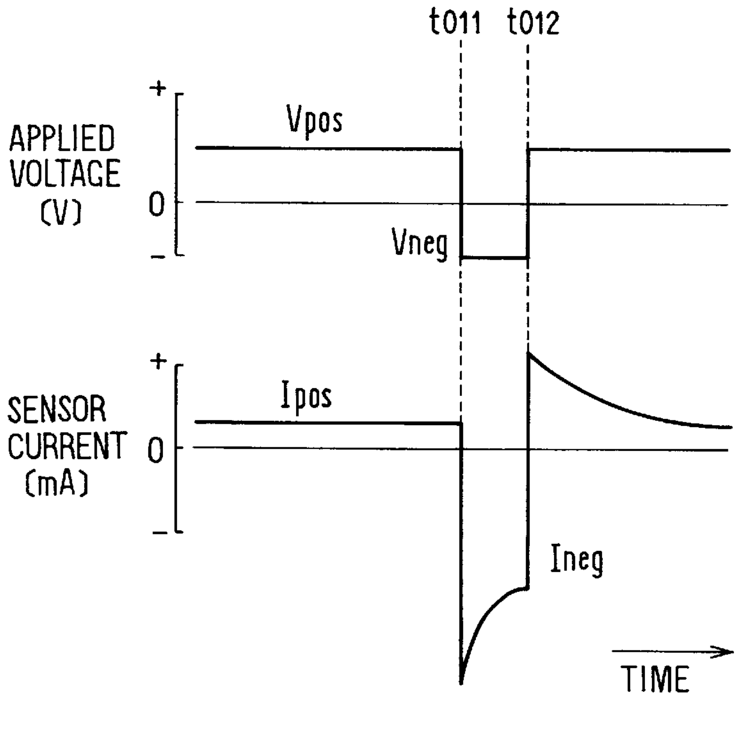

CONTROL METHOD FOR GAS CONCENTRATION SENSOR

CROSS-REFERENCE TO RELATED APPLICATION

The present application is based upon and claims priority of Japanese patent Application Nos. Hei. 9-106103 filed on Apr. 23, 1997 and Hei. 10-89619 filed on Apr. 2, 1998, the contents of which are incorporated herein by reference.

BACKGROUND OF THE INVENTION

1. Field of the Invention

The present invention relates to a gas concentration sensor and, more particularly, to a method for controlling an oxygen concentration sensor for sensing the oxygen concentration in the exhaust gas of an on-vehicle internal combustion engine when the sensor is active by using the element resistance thereof.

2. Description of the Related Art

There have been demands recently for improved accuracy in air-fuel ratio control of motor vehicle engines. In response to these demands, a linear air-fuel ratio sensor, or oxygen concentration sensor, has been developed. The sensor linearly detects, over a wide range, the air-fuel ratio of an air-fuel mixture sucked into the internal combustion engine corresponding to the concentration of oxygen in the exhaust gas. In order to maintain detection precision in such an air-fuel sensor, maintaining the air-fuel sensor in an active state is important. In general, the air-fuel sensor is maintained in an active state by supplying a current to a heater equipped to the air-fuel sensor and heating an element of the air-fuel sensor.

During excitation of the heater, there is conventionally disclosed a technique for sensing the temperature of the sensor element and thereby performing feedback control of the element temperature so that the element temperature reaches a desired activation temperature (e.g. approximately 700° C.). In this case, in order to sense the instantaneous element temperature, a method of equipping a temperature sensor to the sensor element and drawing out the element temperature from the sensed result is known and is commercially practiced. However, in this method, the cost is increased due to the necessity of adding the temperature sensor. On this account, it has been proposed to detect the resistance of the sensor element based on a prescribed correspondence relationship between the element resistance and the element temperature. Thus, it is thereby possible to draw out the element temperature from the detected element resistance. It is to be noted that the detected result of the element resistance is used, for example, also for determining the degree of deterioration of the air-fuel sensor.

FIGS. 32A and 32B are waveform diagrams illustrating conventionally used technique for detection of the element resistance. These Figures illustrate a case where a critical current type oxygen concentration sensor is used as the air-fuel ratio sensor for use in an internal combustion engine. Namely, before a point in time toll in FIGS. 32A and 32B, a prescribed voltage (a positive applied voltage Vpos) for the detection of the air-fuel ratio is applied to the sensor element. The air-fuel (A/F) ratio is determined from a sensor current Ipos output in correspondence with this applied voltage Vpos. Also, during a time period from t011 to t012, a negative applied voltage Vneg for the detection of the element resistance is applied, whereby a sensor current Ineg corresponding to this time period is sensed. By dividing the negative applied voltage Vneg by the corresponding sensor current Ineg, the element resistance ZDC is determined (ZDC=Vneg/Ineg). This detection procedure is generally known as a method of detection of the element resistance that uses the d.c. characteristic of the air-fuel ratio sensor.

The above-described conventional technique is one which detects element resistance (d.c. impedance) by applying a d.c. voltage to the sensor element. In contrast to this, Japanese Patent Laid-Open Publication No. Hei. 4-24657 discloses a technique of detecting element resistance by applying an a.c. voltage to the sensor element. The a.c. voltage is applied continuously to the air-fuel ratio sensor, and the resulting sensor output is passed through a low pass filter, and high pass filter, for separate air-fuel ratio calculations. Thereafter, the both air-fuel ratios are averaged to thereby determine the a.c. impedance. This procedure of detection is generally known as a method of detection of the element resistance that uses the a.c. characteristic of the air-fuel ratio sensor.

According to the above-described d.c. impedance method, the sensor current Ineg that is output when the negative rectangular wave applied voltage Vneg has been applied sharply fluctuates as illustrated in FIG. 32B. If the oxygen concentration is detected during this time period, it is impossible to detect a true oxygen concentration.

Also, according to the a.c. impedance method discussed above, since the air-fuel ratio is detected by passing the sensor output through the low pass filter, there arises the problem that a phase lag occurs in the air-fuel ratio output. Also, a.c. noises are liable to be superimposed on the air-fuel ratio output. These problems are prominent, particularly when the operational state of the internal combustion engine is in a transition state.

In an air-fuel ratio detection microcomputer, as the number of processings to be executed with the same timing increases, the processing load increases. The simultaneous detection processing of the air-fuel ratio, detection processing of the element resistance, and control processing of the element heater with respect to the oxygen concentration sensor all add to the processing load. As a result, processing time length exceeds the processing period, resulting in deviation of the timing of processing during subsequent period.

Further, because the sensor signal is small, when noises are superimposed thereon at the time of detecting the element resistance of the oxygen concentration sensor, the determined element resistance value differs greatly from a true element resistance value.

Further, when detecting the element resistance of the oxygen concentration sensor and thereby selecting the applied voltage from a relevant map, if noises are superimposed on the sensor signal, the selection made with respect to the map becomes unstable.

SUMMARY OF THE INVENTION

The present invention obviates the above-described inconveniences.

More particularly, an air/fuel sensor generates an A/F signal proportional to an oxygen concentration in the exhaust gas from an internal combustion engine upon application of a voltage based on an instruction from a microcomputer. Periodically, an element resistance detection cycle is performed to detect the resistance of a sensor element for sensor temperature control purposes. The element resistance detection cycle, however, causes an inaccurate A/F signal to be output. The present invention prevents the detected A/F value from becoming abnormal during the resistance detection cycle through programmed control routines and specific hardware implementation. As a result, an accurate A/F control can be executed, even during the element resistance detection cycle.

An object of the present invention is to provide a method for controlling the oxygen concentration sensor which, at the time of detecting the element resistance, prevents the detected value of the oxygen concentration from becoming abnormal. Another object of the present invention is to provide a control method for controlling the oxygen concentration sensor which enables the execution of a more precise air-fuel ratio control with the use of the detected element resistance.

BRIEF DESCRIPTION OF THE DRAWINGS

The above and other objects, features and advantages of the present invention will become apparent from the following description when the same is read in conjunction with the accompanying drawings in which:

FIG. 28 is a flow diagram illustrating the procedure of executing the element resistance detection process according to the tenth embodiment of the present invention is applied;

DETAILED DESCRIPTION OF THE PREFERRED EMBODIMENTS

The present invention will now be explained on the basis of embodiments thereof. In the following embodiments, reference will be made to cases where the gas concentration sensor according to the present invention is used as an oxygen concentration sensor for detecting the concentration of oxygen in the exhaust gas of an on-vehicle internal combustion engine.

First Embodiment

Figure 1:
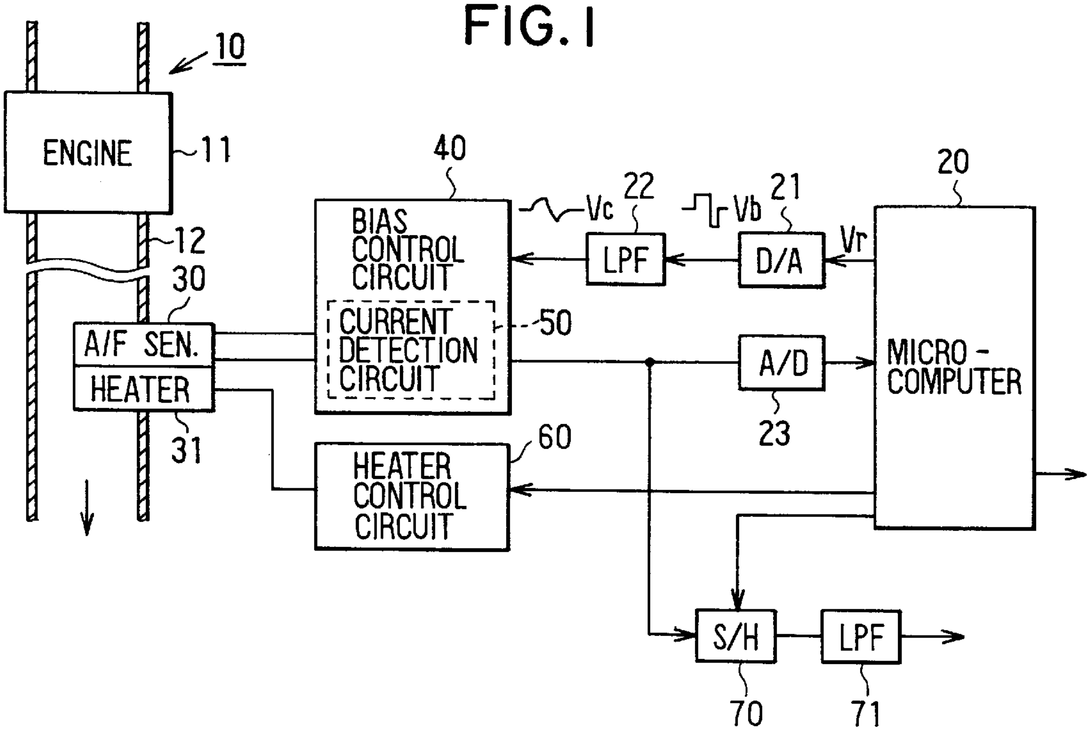
FIG. 1 is a schematic diagram illustrating the construction of an air-fuel ratio detecting apparatus to which control methods for controlling an A/F sensor according to first to eleventh embodiments of the present invention are applied.

FIG. 1 is a schematic diagram illustrating the construction of an air-fuel ratio detecting apparatus to which a control method for controlling an oxygen concentration sensor according to a first embodiment of the present invention is applied (impressed). It is to be noted that the air-fuel ratio detecting apparatus according to this embodiment is adapted for use in an electronically controlled fuel injection system of a motor vehicle internal combustion engine. The injected amount of fuel supplied to the internal combustion engine is increased or decreased according to the detected result, thereby controlling the air-fuel ratio to a desired air-fuel ratio. An explanation of the procedure of detecting the air-fuel ratio (A/F) by the use of an air-fuel ratio sensor, as well as the procedure of detecting the element resistance (impedance) by the use of the sensor a.c. characteristic, follows.

In FIG. 1, the air-fuel ratio detecting apparatus is equipped with a critical current type air-fuel ratio sensor (hereinafter referred to simply as "the A/F sensor") 30 as an oxygen concentration sensor. This A/F sensor 30 is disposed on an exhaust passage 12 connected to a downstream side of an internal combustion engine 11. Upon application of a voltage, based on commands from a micro computer 20, there is output from the A/F sensor 30 a linear air-fuel ratio detection signal corresponding to the concentration of oxygen in the exhaust gas. The microcomputer 20 includes a CPU for executing various known calculation processings, a ROM in which there is stored a control program, a RAM in which there are stored various data, a B/U (back-up) RAM, and other well-known components. According to a prescribed control program, stored in the microcomputer, a bias control circuit 40, a heater control circuit 60, a sample/hold circuit (hereinafter referred to simply as "the S/H circuit") 70 and an oxygen concentration signal detection permission/inhibition signal are controlled.

Next, an explanation will be given with reference to a table of FIG. 2 that illustrates the voltage-current characteristic bf the A/F sensor 30.

Figure 2:
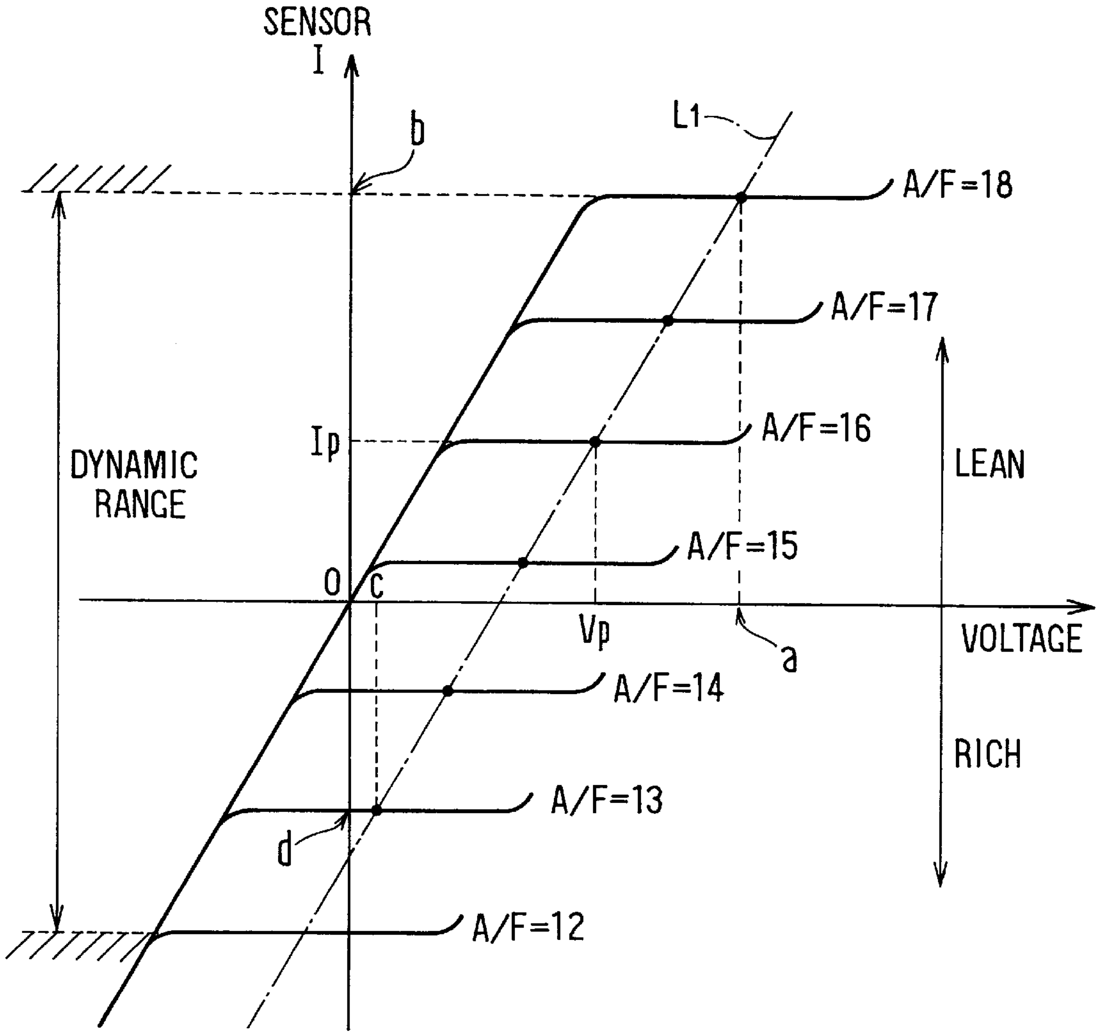
FIG. 2 is a table illustrating the voltage-current characteristic of the A/F sensor used in the air-fuel ratio detecting apparatus according to the first to eleventh embodiments of the present invention are applied.

It is seen from FIG. 2 that the inflow current proportional to the detected A/F ratio value of the A/F sensor 30 and the applied voltage have a linear characteristic. Straight line portions parallel with a voltage axis V each specify the critical current of the A/F sensor 30. The increase or decrease in this critical current (sensor current) corresponds to the increase or decrease (i.e. lean or rich) in the A/F ratio value. That is, the more biased to the lean side the A/F ratio value is, the more increased the critical current is, and the more biased to the rich side the A/F ratio value is, the more decreased the critical current is.

Also, in the voltage-current characteristic of FIG. 2, the voltage region wherein the applied voltage is smaller than that corresponding to the straight line portion parallel with the voltage axis V is a resistance dominated region. The inclination of a first-degree straight line portion in this resistance dominated region is specified by the internal resistance (or the impedance) of the A/F sensor 30. Since this element resistance changes with a change in the temperature, a decrease in the temperature of the A/F sensor 30 results in an increase in the element resistance, which results in a decrease in slope of the inclination.

On the other hand, in FIG. 1, a bias instruction signal (digital signal) Vr for applying a voltage to the A/F sensor 30 is input from the microcomputer 20 to a D/A converter 21. The D/A converter converts the digital signal to an analog signal Vb which is then input to a LPF (low pass filter) 22. An output voltage Vc, prepared by removing a high frequency component of the analog signal Vb by the LPF 22, is input to the bias control circuit 40. Either an A/F detection voltage or an element resistance detection voltage is applied from this bias control circuit 40 to the A/F sensor 30. That is, at the time of detecting the A/F ratio, a prevailing prescribed voltage Vp corresponding to the A/F ratio is applied from the bias control circuit 40 to the A/F sensor 30 by the use of the characteristic line L1 illustrated in FIG. 2. At the time of detecting the element resistance, a voltage which consists of a prescribed frequency signal, and which is singular and has a prescribed time constant, is applied from the bias control circuit 40 to the A/F sensor 30.

Also, the bias control circuit 40 detects, by its current detection circuit 50, the value of the current that flows out from the A/F sensor 30 upon application of a voltage thereto. An analog signal indicating the current value detected by the current detection circuit 50 is input through an A/D converter 23 to the microcomputer 20. The current value detected by the current detection circuit 50 is then converted to an oxygen concentration signal, and is output as an A/F signal through the sample/hold circuit 70 and LPF 71. A heater 31 equipped to the A/F sensor 30 is operationally controlled by the heater control circuit 60. That is, by this heater control circuit 60, the element temperature of the A/F sensor 30 and the power supplied from a battery power source (not illustrated) to the heater 31 in correspondence with the heater temperature are controlled in terms of the duty ratio. The control of heating of the heater 31 is thereby executed.

Next, the electrical construction of the bias control circuit 40 will be explained with reference to the circuit diagram of FIG. 3.

Figure 3:
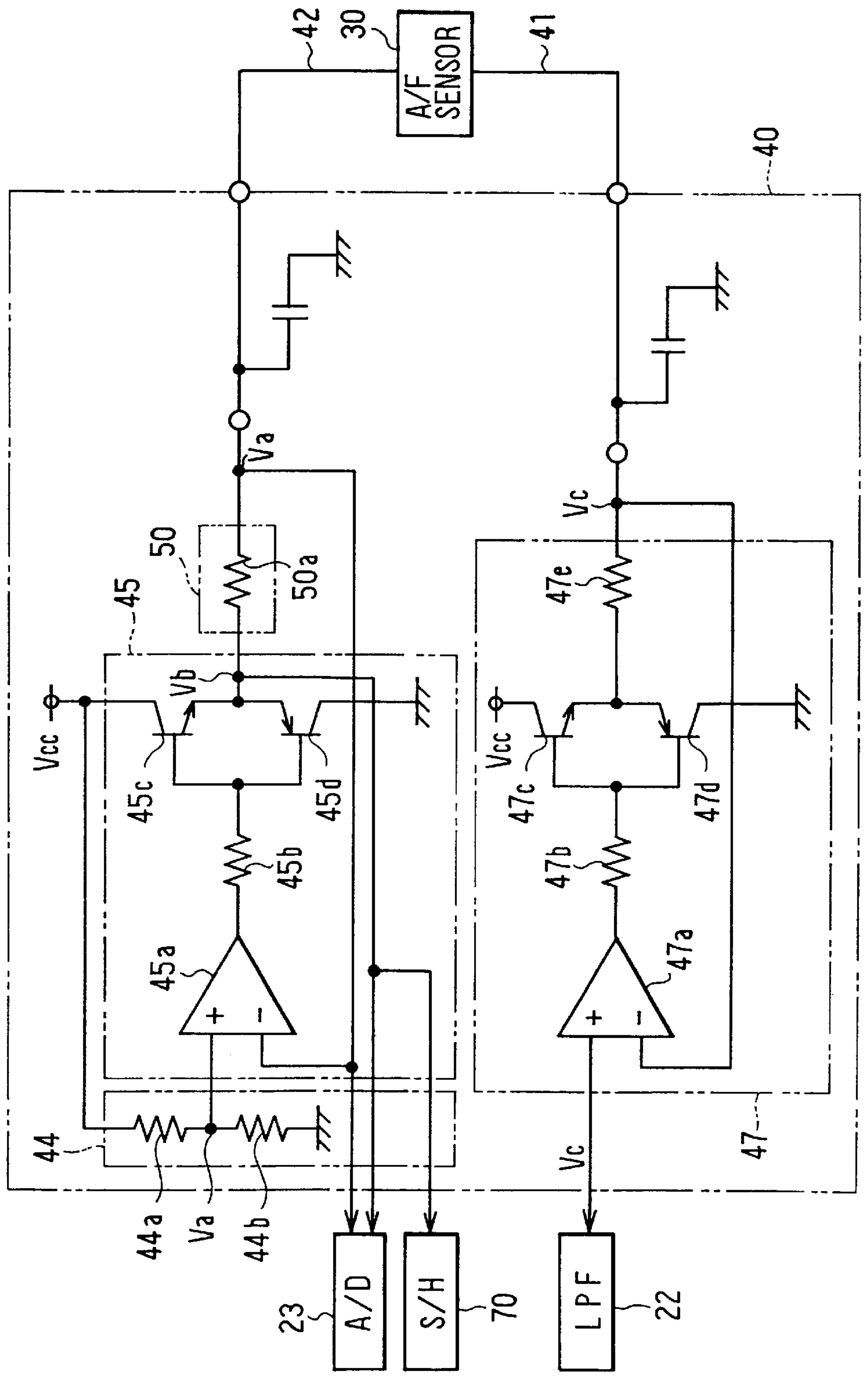
FIG. 3 is a circuit diagram illustrating an electric construction of a bias control circuit according to the first to eleventh embodiments of the present invention are applied.

In FIG. 3, the bias control circuit 40 is roughly composed of a reference voltage circuit 44, a first voltage supply circuit 45, a second voltage supply circuit 47 and the current detection circuit 50. By, the reference voltage circuit 44, a constant voltage Vcc is divided by voltage-dividing resistors 44*a* and 44*b*, whereby a prescribed reference voltage Va is produced.

The first voltage supply circuit 45 includes a voltage follower circuit. A voltage Va that is the same as the reference voltage Va of the reference voltage circuit 44 is supplied from the first voltage supply circuit 45 to a first terminal 42 of the A/F sensor 30. More specifically, the first voltage supply circuit 45 includes an operational amplifier 45*a* whose positive side input terminal is connected to a voltage-dividing point between the voltage-dividing resistors 44*a* and 44*b*, and whose negative side input terminal is connected to the first terminal 42 of the A/F sensor 30. The circuit 45 also includes a resistor 45*b* with a first end connected to an output terminal of the operational amplifier 45*a*, and a second end being connected to the bases of an NPN transistor 45*c* and PNP transistor 45*d*. The collector of the NPN transistor 45*c* is connected to the constant voltage Vcc. The emitter thereof is connected to the terminal 42 of the A/F sensor 30 through a current detection resistor 50*a* of the current detection circuit 50. Also, the emitter of the PNP transistor 45*d* is connected to the emitter of the NPN transistor 45*c*, and the collector thereof is grounded.

The second voltage supply circuit 47 is also a voltage follower circuit. A voltage vc that is the same as the output voltage Vc of the LPF 22 is supplied from the second voltage supply circuit 47 to the second terminal 41 of the A/F sensor 30. More specifically, the second voltage supply circuit 47 includes an operational amplifier 47*a* whose positive side input terminal is connected to an output terminal of the LPF 22, and whose negative side input terminal is connected to the second terminal 41 of the A/F sensor 30. A resistor 47*b* has one end connected to an output terminal of the operational amplifier 47*a*, and a second end connected to the bases of an NPN transistor 47*c* and PNP transistor 47*d*. The collector of the NPN transistor 47*c* is connected to the constant voltage Vcc. The emitter thereof is connected to the second terminal 41 of the A/F sensor 30 through a resistor 47*e*. Also, the emitter of the PNP transistor 47*d* is connected to the emitter of the NPN transistor 47*c*, and the collector thereof is grounded.

With the above-described construction, to the one terminal 42 of the A/F sensor 30 there is at all times supplied the constant voltage Va. When the voltage Vc, which is lower than the constant voltage Va, is applied to the terminal 41 of the A/F sensor 30 through the LPF 22, the A/F sensor 30 is positively biased. Also, when the voltage Vc is higher than the constant voltage Va and is applied to the terminal 41 through the LPF 22, the A/F sensor 30 is negatively biased.

The microcomputer 20 controls the S/H circuit 70 and the A/F signal detection permission/inhibition signal, thereby stabilizing the A/F signal. That is, the S/H circuit 70 is normally set to the sample state by the microcomputer 20. Therefore the present A/F signal is output from the S/H circuit 70. On the other hand, at the time of detecting the element resistance, the S/H circuit 70 is set to the hold state by the microcomputer 20. Therefore the A/F signal obtained previously, when the S/H circuit 70 was in the preceding sample state, is output from the S/H circuit 70. Also, from the microcomputer 20, the A/F signal detection permission signal is normally output. At the time of detecting the element resistance, the A/F signal detection inhibition signal is output.

Next, the function of the air-fuel ratio detecting apparatus having the above-described construction will be explained.

Figure 4:
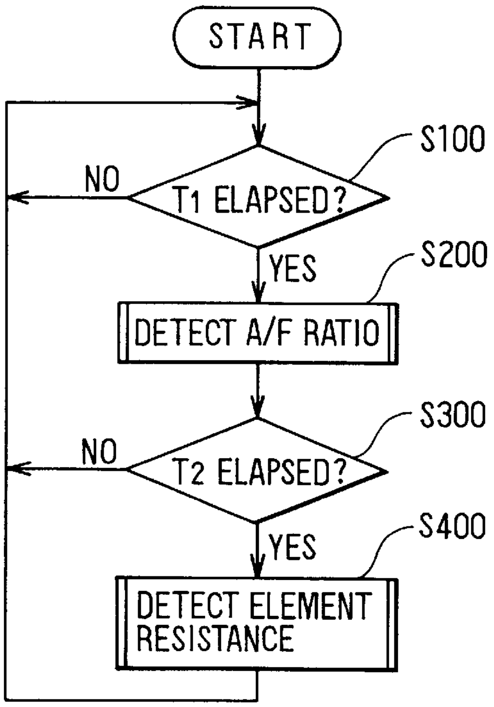
FIG. 4 is a flow diagram illustrating a main routine of a control performed in a microcomputer according to the first embodiment of the present invention is applied.

FIG. 4 is a flow diagram illustrating a main routine of the control performed in the microcomputer used in the air-fuel ratio detecting apparatus to which the control method for controlling the A/F sensor according to the first embodiment of the present invention is applied. This main routine is started when the power is supplied to the microcomputer 20.

In FIG. 4, first, at step S100, it is determined whether a prescribed time period T1 has elapsed from a point in time at which the A/F ratio was previously detected. Here, the prescribed time period T1 is a time period corresponding to the A/F detection period and is set to be, for example, 2 to 4 ms or so. When the determination condition in step S100 is satisfied, and the prescribed time period T1 has elapsed from the previous A/F detection time period, the routine advances to step S200, whereby the sensor current Ip (critical current) detected by the current detection circuit 50 is read in and, using a characteristic map stored previously in the ROM, the A/F ratio of the internal combustion engine 11 corresponding to the sensor current Ip prevailing at that time is detected. At this time, using the characteristic line L1 illustrated in FIG. 2, the voltage Vp corresponding to the detected A/F result is applied to the A/F sensor 30.

Next, the routine advances to step S300, where it is determined whether a prescribed time period T2 has elapsed from a point in time at which the element resistance was previously detected. Here, the prescribed time period T2 is a time period corresponding to the detection period of the element resistance and is selectively set in correspondence with, for example, the operational state of the internal combustion engine 11. This detection period is set to be, for example, 2 sec at a normally changing time (stationary operation time) when the change in A/F is relatively small. The detection period is set to be, for example, 128 ms at a sharply changing time (transition operation time) when the A/F sharply changes. When the determination condition at step S300 is not satisfied, processing from step S100 to step S300 is repeatedly executed, whereby the A/F is detected each time the prescribed time period T1 elapses.

On the other hand, when the determination condition at step S300 is satisfied and the prescribed time period T2 has elapsed from the previous element resistance detection time, the routine advances to step S400, where the element resistance detection processing is executed. Thereafter, the flow returns to step S100, whereby the same processing is repeatedly executed.

Next, a subroutine for executing the element resistance detection processing in step S400 of FIG. 4 will be explained with reference to FIG. 5.

Figure 5:
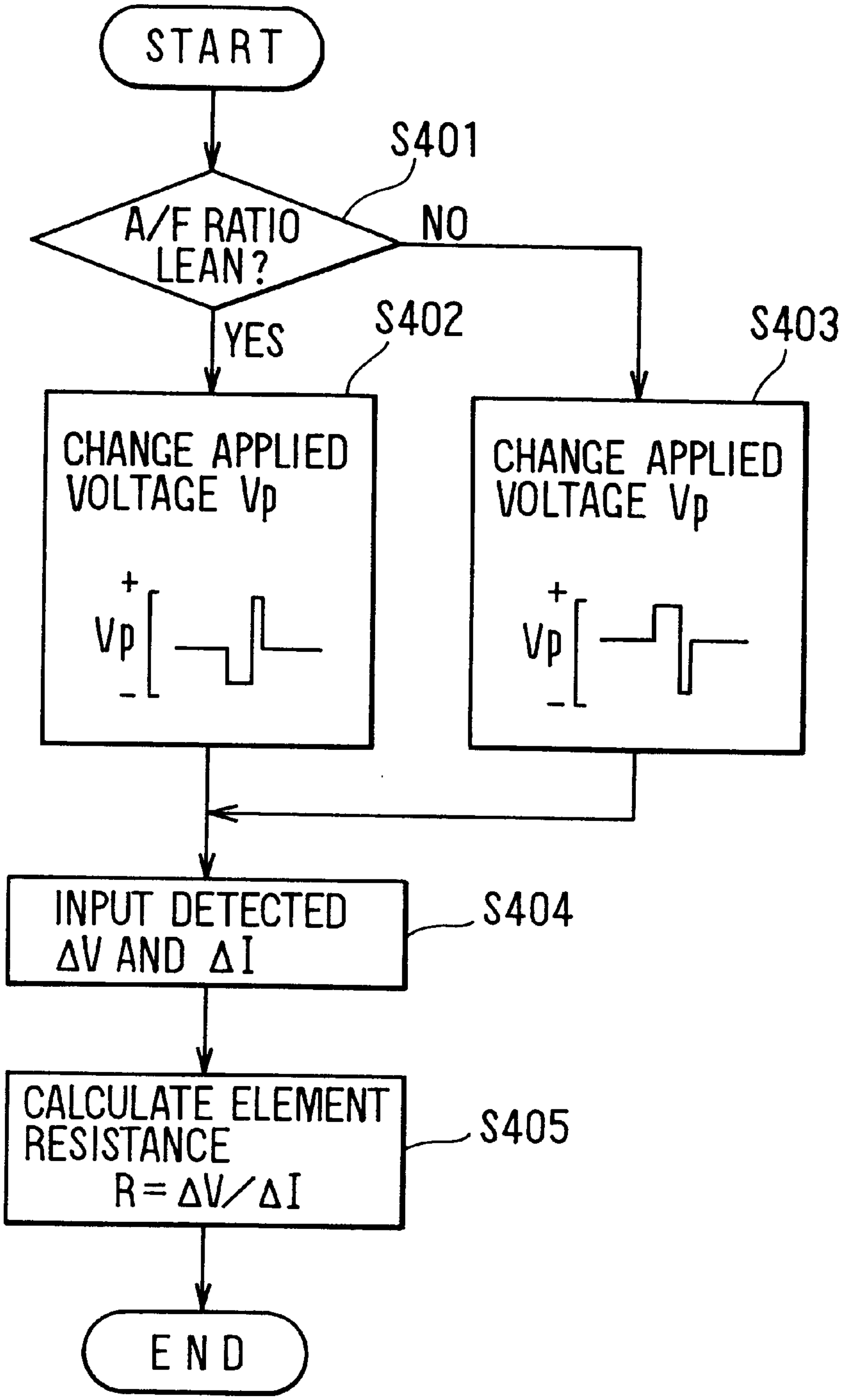
FIG. 5 is a flow diagram illustrating a sub-routine of the element resistance detection process of FIG. 4.

In FIG. 5, first, in step S401, it is determined whether the present A/F ratio is lean. When the determination condition in step S401 is satisfied and accordingly the A/F ratio is lean, the routine proceeds to step S402, where the applied voltage Vp (A/F detection voltage) that has theretofore been applied is changed from a negative voltage to a positive voltage. On the other hand, when the determination condition at step S401 is not satisfied, and accordingly the A/F ratio is rich, the flow proceeds to step S403, where the applied voltage Vp that has theretofore been applied is changed from a positive voltage to a negative voltage (the bias instruction signal Vr is operated).

After the switch processing of the applied voltage in step S402 or in step S403, the routine proceeds to step S404 where the amount of change in the voltage ΔV and the amount of change in the sensor current ΔI detected by the current detection circuit 50 are read. Next, the routine proceeds to step S405 where the element resistance R is calculated using the ΔV and ΔI ($R=\Delta V/\Delta I$). The subroutine subsequently ends.

Figure 6A:
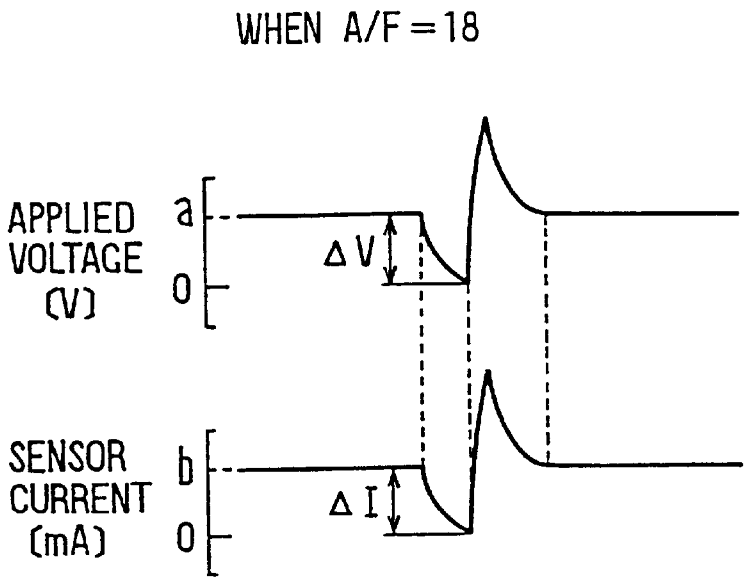
FIGS. 6A and 6B are waveform diagrams each illustrating a change in voltage applied to the A/F sensor according to the first embodiment of the present invention, and a subsequent change in current.
Figure 6B:
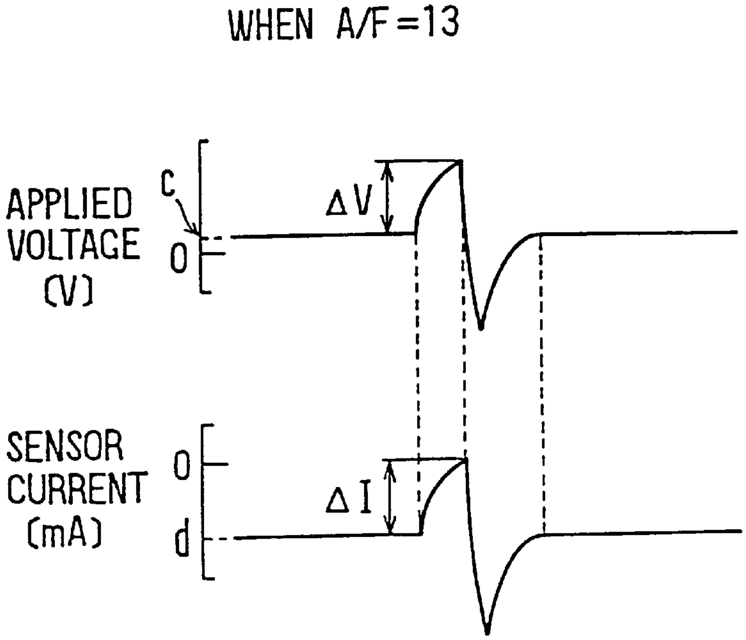

FIGS. 6A and 6B each illustrate the waveform of the voltage Vc output through the LPF 22, and the waveform of the sensor current that flows through the A/F sensor 30 upon application of the applied voltage. Here, when the A/F ratio is lean, such as when the A/F ratio=18, as illustrated in FIG. 6A, the applied voltage with respect to the A/F sensor 30 is changed by the amount of change ΔV to the negative side, whereby the amount of change ΔI in the sensor current to the negative side that corresponds to this change in voltage is detected. It is to be noted that the applied voltage=a and the sensor current=b in the figure correspond to the points (a) and (b) in FIG. 2, respectively. Also, when the A/F ratio is rich such as when the A/F ratio=13, as illustrated in FIG. 6B, the applied voltage with respect to the A/F sensor 30 is changed by the amount of change ΔV to the positive side, whereby the amount of change ΔI in the sensor current to the positive side that corresponds to this change in voltage is detected. It is to be noted that the applied voltage=c and the sensor current=d in the figure correspond to the points (c) and (d) in FIG. 2, respectively.

At this time, since, in the case of "lean", the applied voltage is changed to the negative side, and, in the case of "rich", the applied voltage is changed to the positive side to thereby determine the sensor current that corresponds to each change in voltage, there is no possibility that this sensor current will exceed the dynamic range (see FIG. 2) of the current detection circuit 50.

Figure 7:
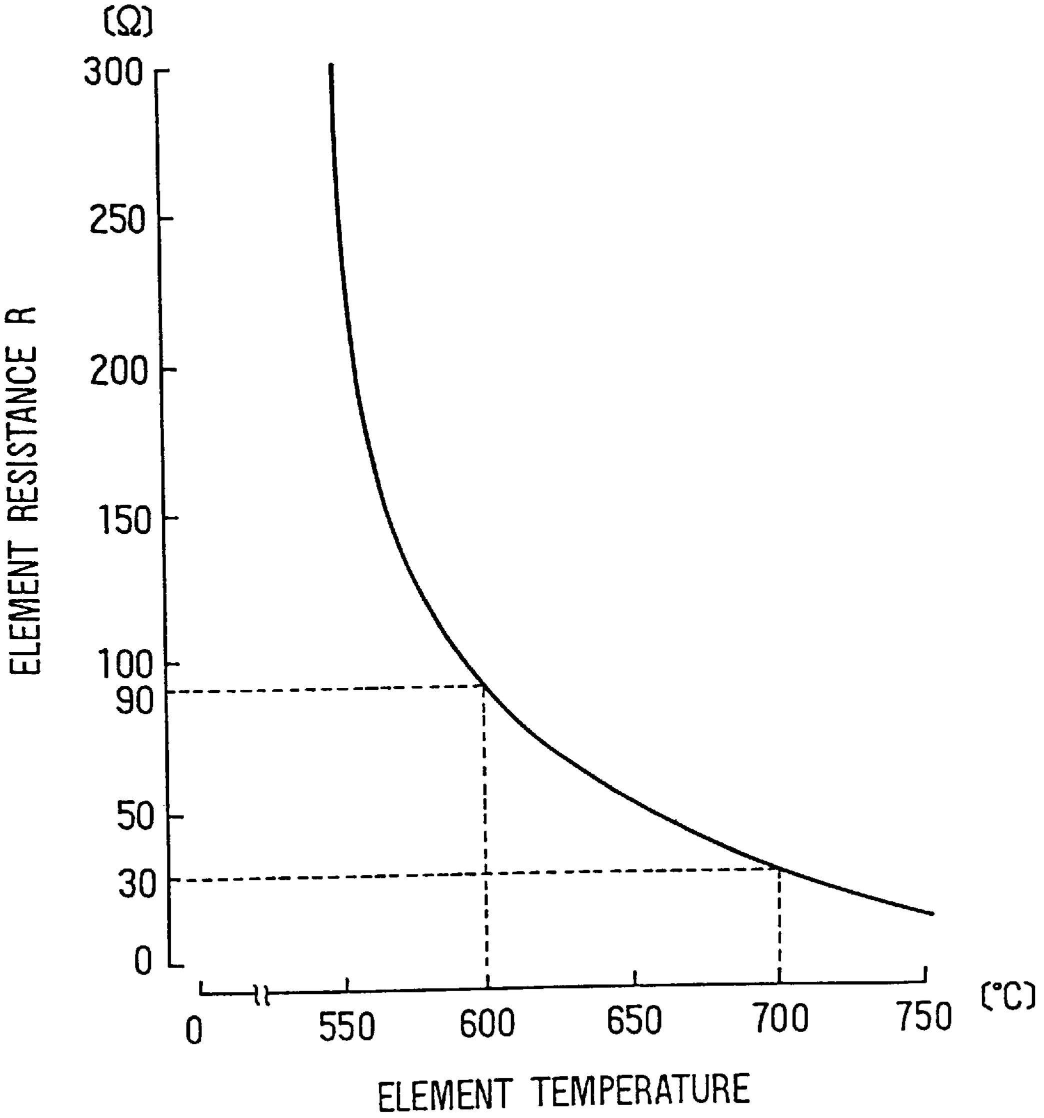
FIG. 7 is a characteristic diagram illustrating the relationship between the element temperature and element resistance of the A/F sensor according to the first embodiment of the present invention is applied.

On the other hand, the element resistance R that has been determined in the above manner has a relationship illustrated in FIG. 7 with respect to the element temperature. That is, the element resistance R has a relationship with respect to the latter wherein the higher the element temperature becomes, the more quickly the element resistance decreases. The element resistance R=90 Ω corresponds to the temperature of 600° C. at which the A/F sensor 30 is activated to some extent. On the other hand, the element resistance R=30 Ω corresponds to the temperature of 700° C. at which the A/F sensor 30 is sufficiently activated. The amount of current supplied to the heater 31 is selectively controlled in terms of the duty ratio to obviate the deviation between the calculated element resistance R and the target resistance value (e.g. 30 Ω). Namely, feedback control of the element temperature is executed.

Next, an explanation will be given according to the flow diagram of FIG. 8, which illustrates the procedure of executing the element resistance detection process to control the microcomputer used in the first embodiment of the present invention, with reference to timing diagrams of FIG. 9. It is to be noted that in the timing diagrams used in the explanation in each of the following embodiments, the representation of time on the abscissa axis is omitted, and the time period Tc in each relevant figure represents the detection period of the element resistance.

Figure 8:
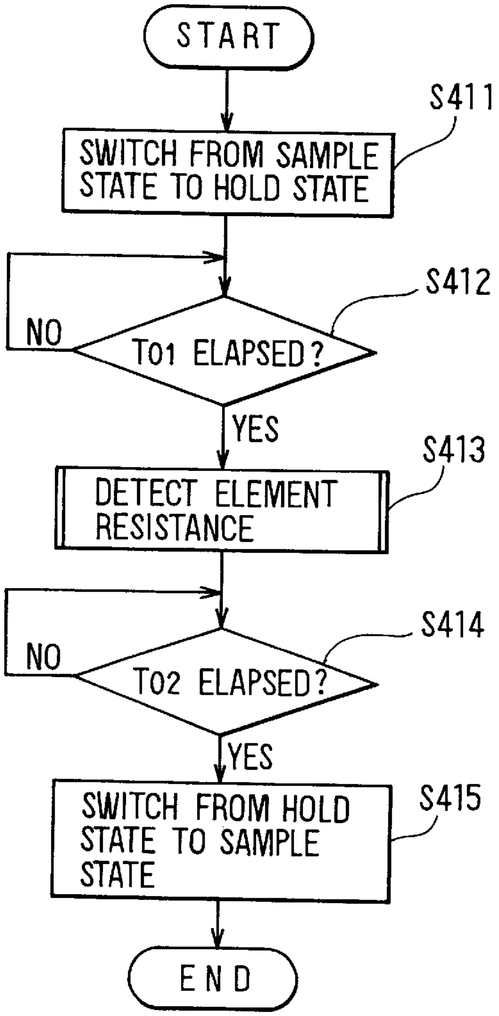
FIG. 8 is a flow diagram illustrating the procedure of executing the element resistance detection process according to the first embodiment of the present invention is applied.
Figure 9:
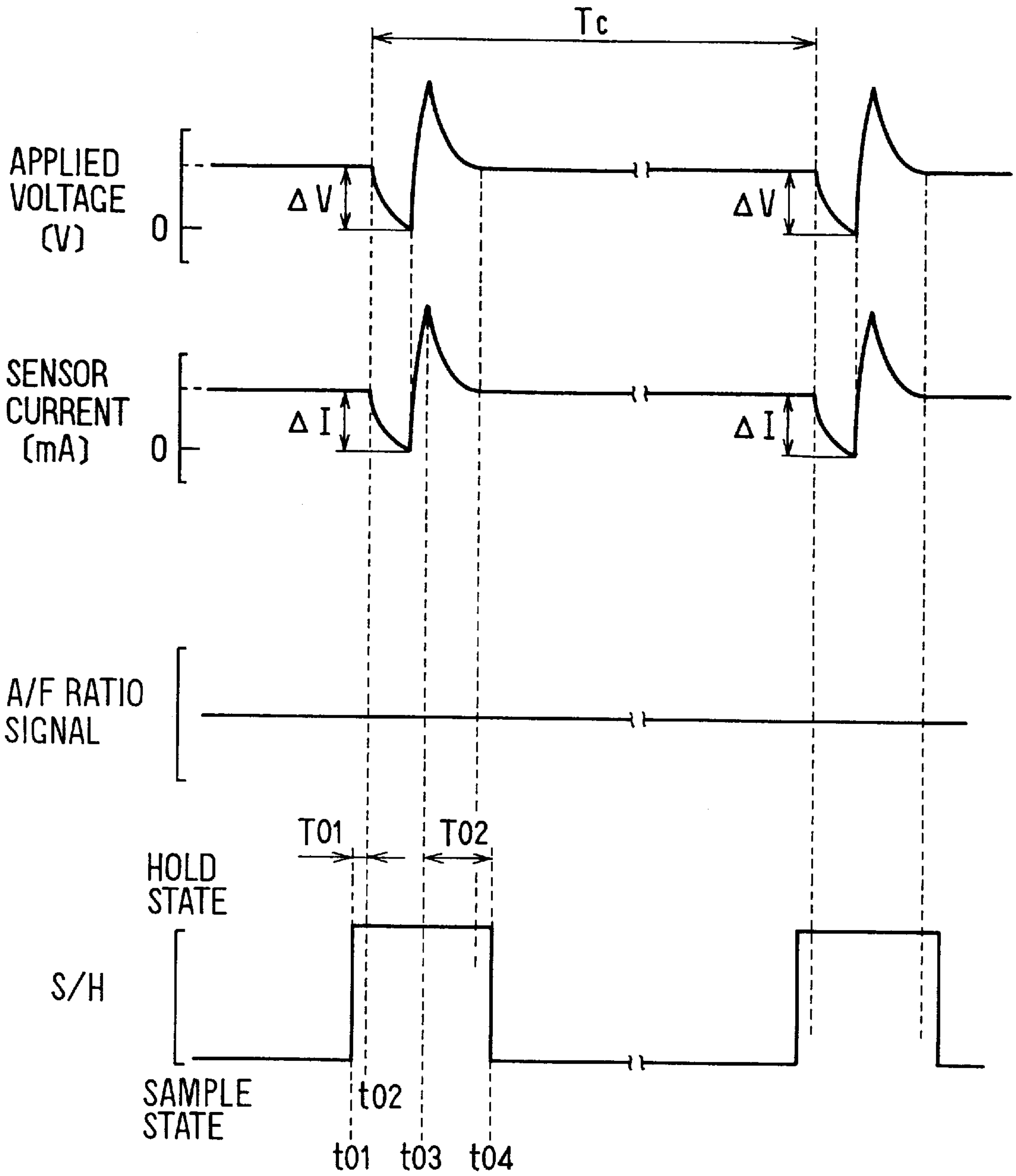
FIG. 9 is a timing diagram illustrating in detail the function performed in FIG. 8.

In FIG. 8, first, in step S411, the sample/hold function performed by the S/H circuit 70 is switched from the sample state to the hold state, whereby the present A/F signal is held (the time t01 in FIG. 9). In step S412, the routine pauses until a prescribed time period T01 elapses (from the time t01 to the time t02 in FIG. 9). Then, the routine proceeds to step S413 where the element resistance detection processing illustrated in FIG. 5 is executed. Next, at step S414, the routine pauses until a prescribed time period T02, that allows the fluctuation of the output of the A/F sensor 30 to become zero, elapses (from the time t03 to the time tO4 in FIG. 9). The routine then proceeds to step S415 where the sample/hold function performed by the S/H circuit 70 is set from the hold state to the sample state (the time t04 in FIG. 9). This routine is thereafter ended.

In this way, the invention is embodied as the control method for controlling the A/F sensor 30 for outputting the sensor current (current signal) corresponding to the A/F ratio (oxygen concentration) in the exhaust gas upon application of a voltage. Namely, at the time of detecting the element resistance R of the A/F sensor 30, according to the amount of change in the current ΔI that follows the amount of change in the voltage ΔV, the change in current in the A/F sensor 30 is interrupted, and the A/F signal that indicates the sensor current corresponding to the A/F ratio that has theretofore prevailed is held.

As the applied voltage, and the sensor current changes, in order to detect the element resistance R of the A/F sensor 30, the A/F signal also inconveniently changes. Therefore the A/F signal obtained at this time is not a true A/F signal. Accordingly, as the element resistance R is detected by the use of the A/F sensor 30, the change in current in the A/F sensor 30 is interrupted. The A/F signal obtained before the voltage is changed for the purpose of detecting the element resistance is held. As a result, because the A/F signal obtained before the timing with which the element resistance is detected is held, there is no possibility that an erroneous A/F signal may be used when detecting the element resistance.

Second Embodiment

Next, an explanation will be given according to a flow diagram of FIG. 10, which illustrates the procedure of executing the element resistance detection process according to the second embodiment of the present invention, with reference to timing diagrams of FIG. 11. It is to be noted that the schematic construction of the air-fuel ratio detecting apparatus according to this embodiment and the like are the same as in the case of FIGS. 1 to 3, and therefore detailed descriptions thereof will be omitted.

Figure 10:
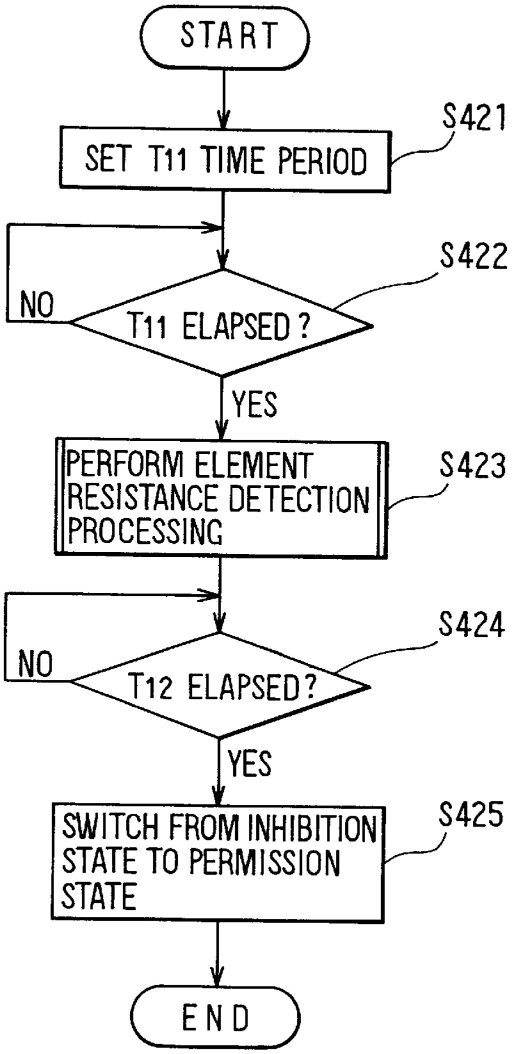
FIG. 10 is a flow diagram illustrating the procedure of executing the element resistance detection process according to the second embodiment of the present invention is applied.
Figure 11:
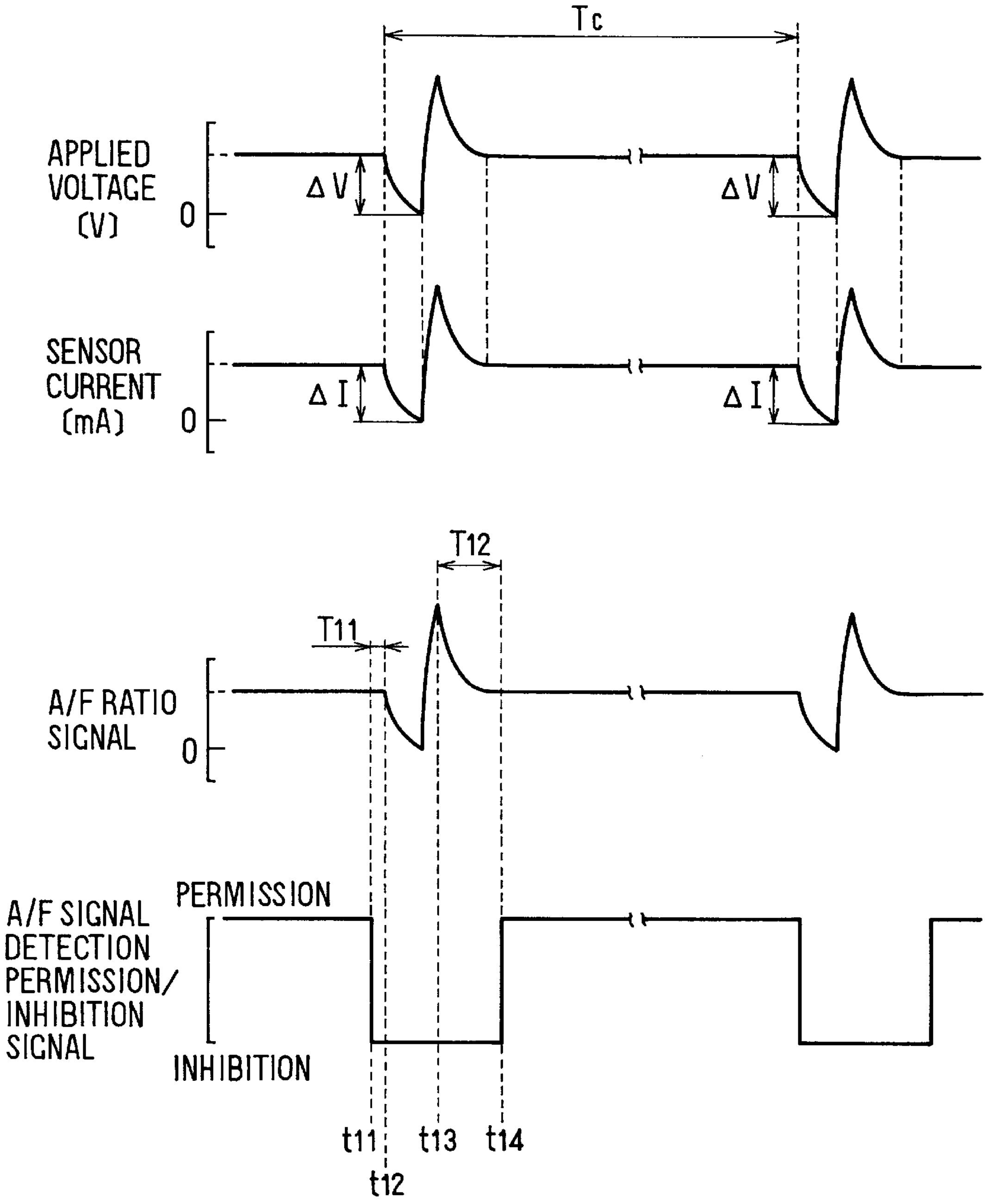
FIG. 11 shows timing diagrams illustrating in detail the function performed in FIG. 10.

In FIG. 10, first, at step S421, the A/F signal detection permission/inhibition signal is set from the permission state to the inhibition state (the time t11 in FIG. 11). At step S422, the routine pauses until a prescribed time period T11 elapses (from the time t11 to the time t12 in FIG. 11). Then, the routine proceeds to step S423 where the element resistance detection processing illustrated in FIG. 5 is executed. Next, in step S424, the process pauses until a prescribed time period T12, a time period needed for the fluctuation of the output of the A/F sensor 30 to become zero, elapses (from the time t13 to the time t14 in FIG. 11). The routine then proceeds to step S425 where the A/F signal detection permission/inhibition signal is switched from the inhibition state to the permission state (the time t14 in FIG. 11). This routine is thereafter ended.

The second embodiment is directed to a control method for controlling the A/F sensor 30 to output the sensor current corresponding to the A/F ratio in the exhaust gas upon application of the voltage. Namely, at the time of detecting the element resistance R of the A/F sensor 30 according to the amount of change in the current ΔI that follows the amount of change in the voltage ΔV, a signal is output for inhibiting the use of the A/F signal from the A/F sensor 30. That output signal indicates the sensor current corresponding to the A/F ratio.

That is, while changing the applied voltage and thereby changing the sensor current in order to detect the element resistance R of the A/F sensor 30, the A/F signal also changes. Therefore, the A/F signal obtained at that time is not a true A/F signal. Accordingly, when detecting the element resistance R by the use of the A/F sensor 30, the use of the A/F signal is inhibited. As a result, when detecting the element resistance, because the use of the A/F signal is inhibited, there is no possibility that an erroneous A/F signal may be used.

Third Embodiment

Figure 12:
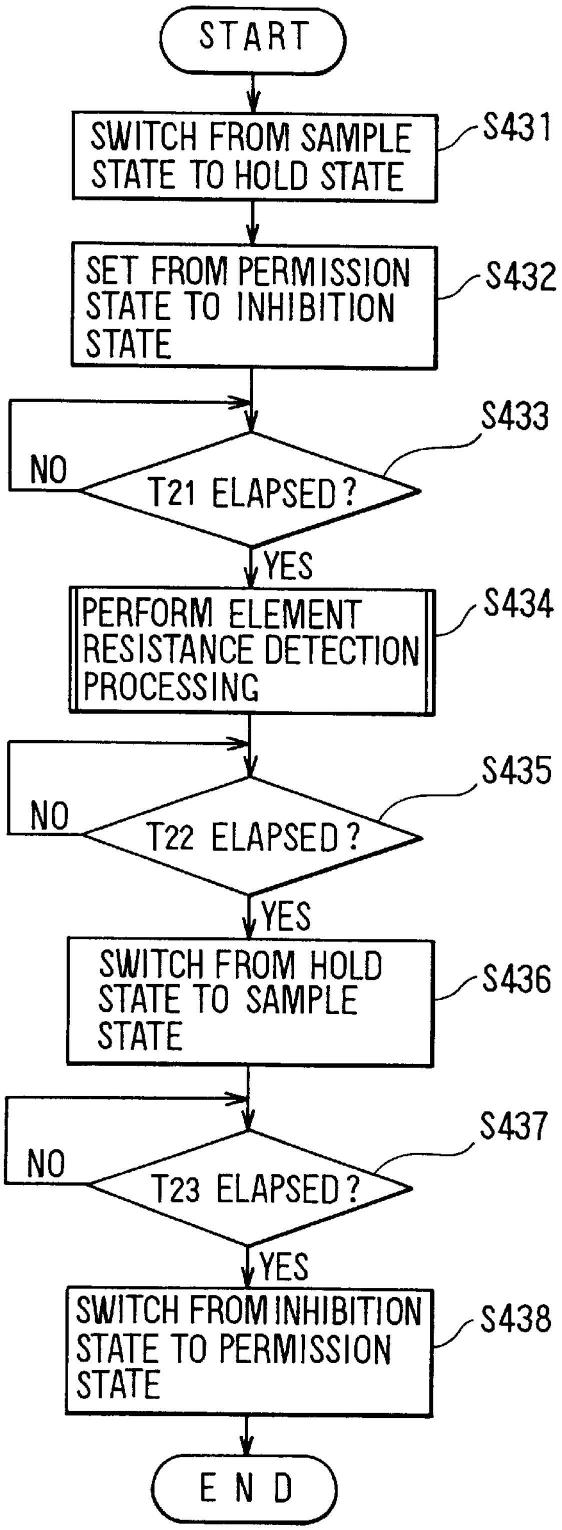
FIG. 12 is a flow diagram illustrating the procedure of executing the element resistance detection process according to the third embodiment of the present invention.

Next, an explanation will be given according to a flow diagram of FIG. 12 illustrating the procedure of executing the element resistance detection process according to the third embodiment of the present invention, and with reference to the timing diagrams of FIG. 13. It is to be noted that the schematic construction of the air-fuel ratio detecting apparatus according to this embodiment and the like are the same as in the case of FIGS. 1 to 3. Therefore, detailed descriptions thereof will be omitted. Also, in this embodiment, an explanation will be given of only a time period during which the actual A/F signal is changing from the rich side to the lean side (ascending right). This embodiment is effective to connect the LPF 71 to the S/H circuit 70 to thereby output an A/F signal, or to control the external read-in of the A/F signal by the A/F signal detection permission/inhibition signal, as illustrated in FIG. 1.

Figure 14:
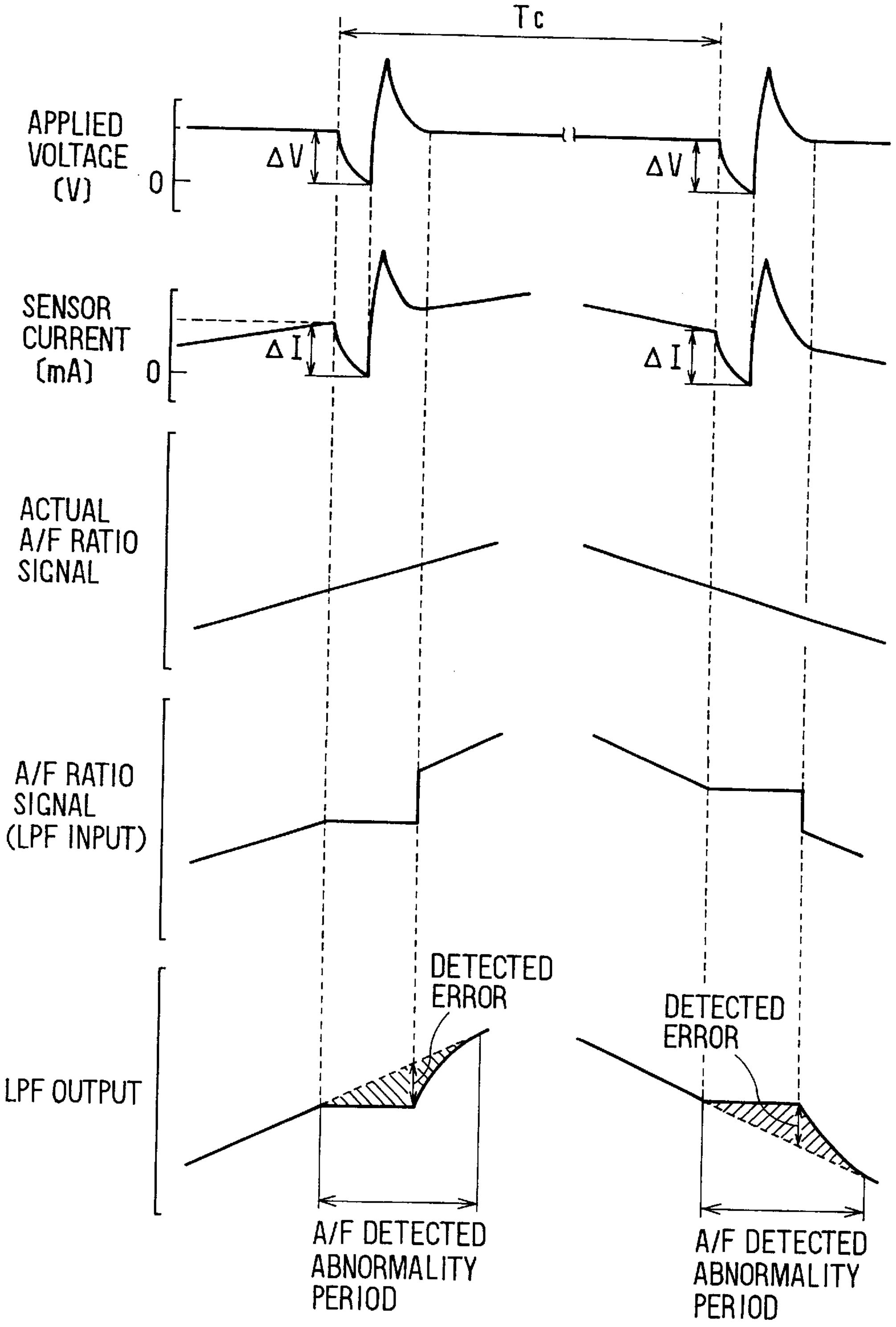
FIG. 14 shows timing diagrams illustrating the effects of timing considering only the sample hold function with respect to a change in A/F ratio, based on the A/F sensor used in the air-fuel ratio detecting apparatus according to the third embodiment of the present invention is applied.

That is, as illustrated in FIG. 14, during the time period in which the actual A/F signal is changing, at the point in time when the S/H circuit 70 has been released from the hold state and has instead been switched to the sample state, there is the possibility that the A/F signal does not reach a true value due to the effect of the LPF 71. Thus, an error portion that corresponds to the effect of the LPF 71 is superimposed on the A/F signal, resulting in an erroneous detection.

Figure 15:
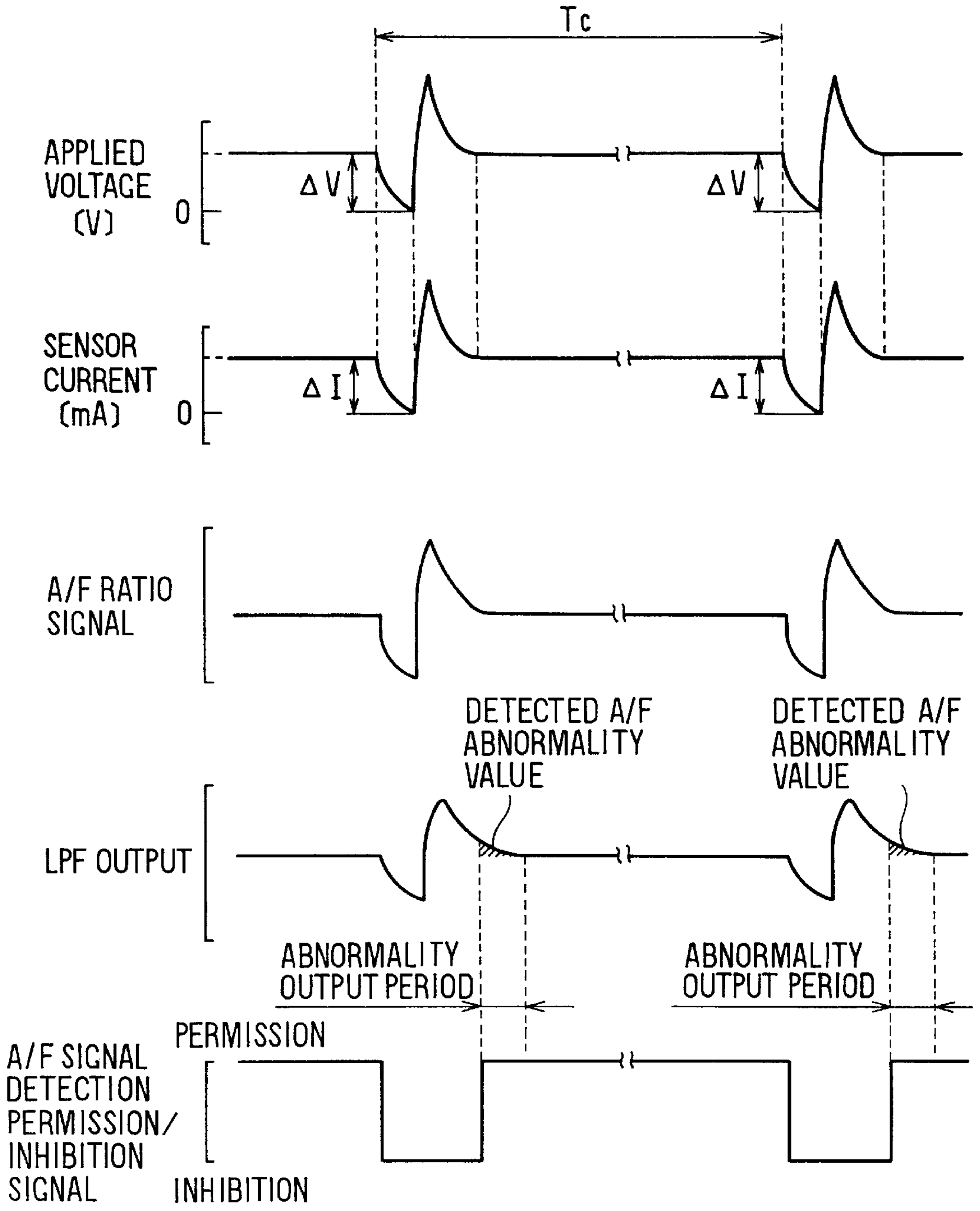
FIG. 15 shows timing diagrams illustrating the inconveniences that occur when having considered only the A/F signal detection permission/inhibition function with respect to a change in A/F ratio based on the use of the A/F sensor according to the third embodiment of the present invention is applied.

Further, as illustrated in FIG. 15, when detecting the A/F signal from the A/F signal annealed by the externally connected LPF by the use of only the A/F signal detection permission/inhibition signal, when the A/F signal detection permission/inhibition signal has been changed from the A/F signal detection inhibition state to the A/F signal detection permission state, the A/F signal may not reach a true value. At this time also, the error portion that corresponds to the annealing performed by the LPF is superimposed on the A/F signal, resulting in an erroneous detection.

Figure 13:
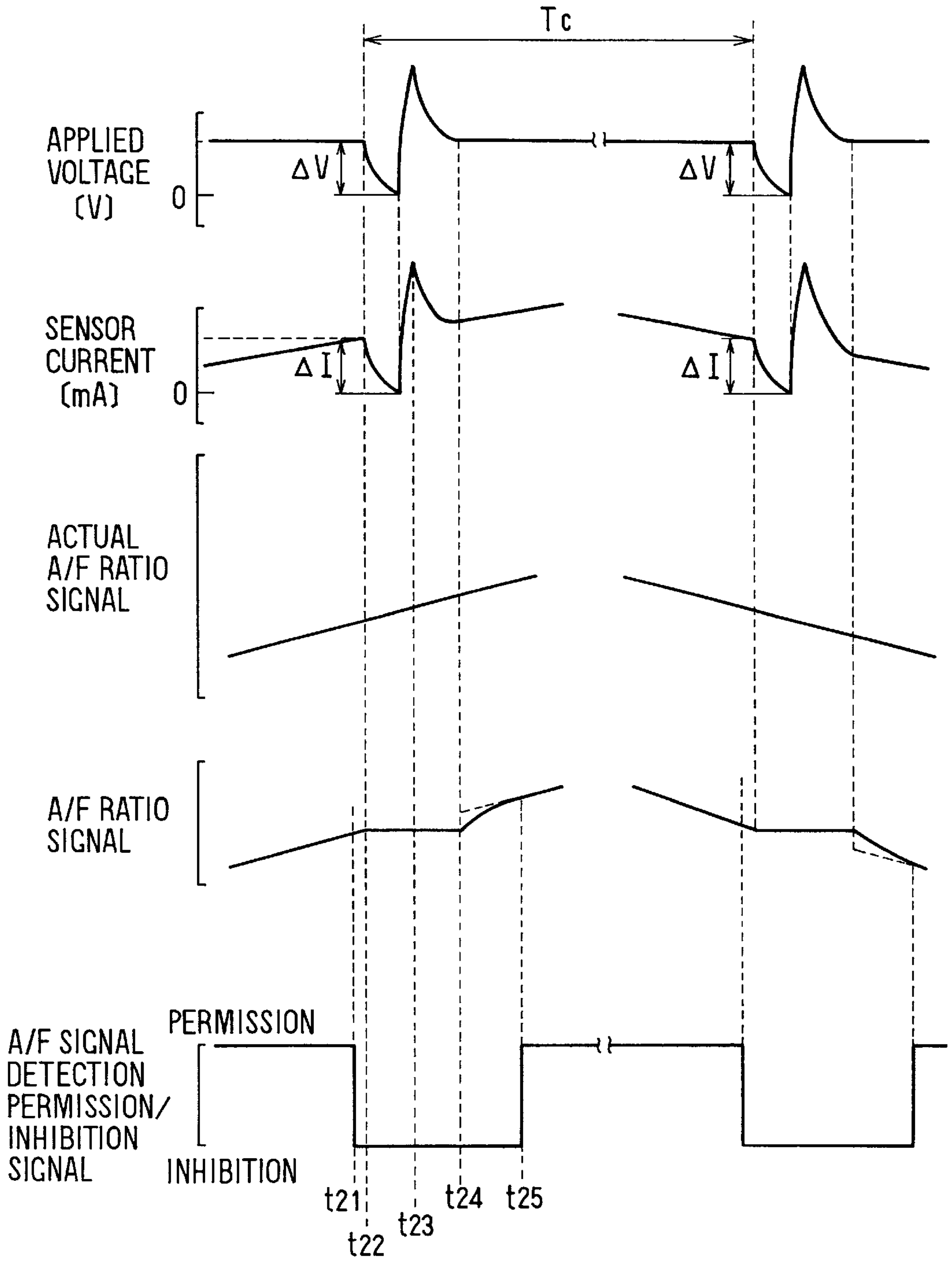
FIG. 13 shows timing diagrams illustrating in detail the function performed in FIG. 12.

Referring to FIG. 12, in order to cope with the above-described limitations, at step S431, the sample/hold function performed by the S/H circuit 70 is switched from the sample state to the hold state, whereby the present A/F signal is held (the time t21 in FIG. 13). Next, the routine proceeds to step S432 where the A/F signal detection permission/inhibition signal is set from the permission state to the inhibition state (the time t21 in FIG. 13). And, at step S433, the routine pauses until a prescribed time period T21 elapses (from the time t21 to the time t22 in FIG. 13). Then, the flow proceeds to step S434 where the element resistance detection processing illustrated in FIG. 5 is executed. Next, at step S435, the routine pauses until a prescribed time period T22, needed for the fluctuation of the output of the A/F sensor 30 to become suppressed or zeroed, elapses (from the time t23 to the time t24 in FIG. 13). The routine then proceeds to step S436 where the sample/hold function performed by the S/H circuit 70 is set from the hold state to the sample state (the time t24 in FIG. 13). Next, the routine proceeds to step S437 where the routine pauses until a prescribed time period T23, needed for the effect of the annealing of the LPF upon the A/F signal to become zeroed, elapses (from the time t24 to the time t25 in FIG. 13). The routine then proceeds to step S438 where the A/F signal detection permission/inhibition signal is switched from the inhibition state to the permission state (the time t25 in FIG. 13). This routine is thereafter ended.

Thus, this embodiment is directed to method for controlling the A/F sensor 30 to output the sensor current corresponding to the A/F ratio in the exhaust gas upon application of a voltage. Namely, at the time of detecting the element resistance R of the A/F sensor 30 according to the amount of change in the current ΔI which follows the amount of change in the voltage ΔV, the change in current in the A/F sensor 30 is interrupted. The A/F signal is then held to indicate the sensor current corresponding to the A/F that has theretofore prevailed, whereby use of the A/F signal from the A/F sensor 30 that indicates the sensor current corresponding to the A/F ratio is inhibited.

That is, while changing the applied voltage and thereby changing the sensor current in order to detect the element resistance R of the A/F sensor 30, the A/F signal also changes. Therefore the A/F signal obtained at that time is not a true A/F signal. Accordingly, at the time of detecting the resistance R by the use of the A/F sensor 30, the change in current in the A/F sensor 30 is interrupted. The A/F signal obtained before the voltage change is held to detect the element resistance. Thus, the use of the A/F signal is inhibited until the same coincides with the actual A/F signal. As a result, when detecting the element resistance, because the A/F signal obtained before the timing with which the element resistance is detected is held, consideration is given also to the annealed portion of the signal annealed by the LPF or the like, and inhibition is made of the use of the A/F signal during the element resistance detection, there is no possibility that an erroneous A/F signal may be used.

Fourth Embodiment

Next, referring to FIG. 16, an explanation will be given according to a flow diagram illustrating the procedure of executing the element resistance detection process according to the fourth embodiment of the present invention is applied. It is to be noted that the schematic construction of the air-fuel ratio detecting apparatus according to this embodiment and the like are the same as in the case of FIGS. 1 to 3 and therefore detailed descriptions thereof will be omitted.

First, the processing contents and processing loads which correspond to the processing timings of the microcomputer 20 will be explained with reference to FIG. 17.

Figure 17:
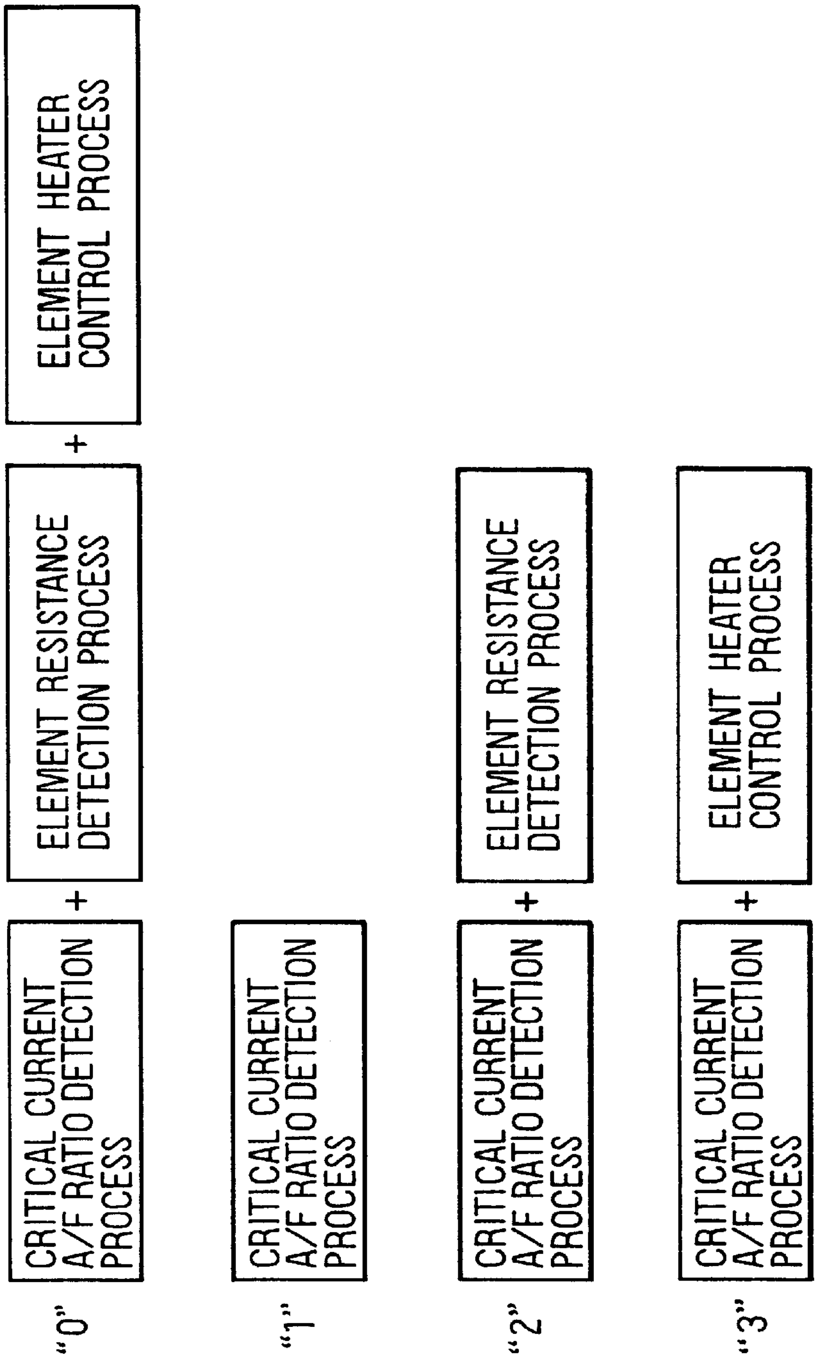
FIG. 17 is a block diagram illustrating the function performed in FIG. 16.

In FIG. 17, in order for the microcomputer 20 to execute the element resistance detection process and element heater control process, in addition to its primary critical current A/F ratio detection process by the use of the A/F sensor 30, a prescribed processing time length for executing each of these processes is necessary. Namely, as illustrated as the processing contents "0", in a case where the critical current A/F detection process, the element resistance detection process, and the element heater control process are executed simultaneously, the processing load of the microcomputer 20 is the highest.

In contrast to this, the load of the microcomputer 20 that is applied when the critical current A/F detection process and element resistance detection process are executed simultaneously, as illustrated as the processing contents "2", or when the critical current A/F detection process and element heater control process are executed simultaneously, as illustrated as the processing contents "3", is, of course, higher than the load of the microcomputer 20 that is applied when only the critical current A/F detection process is executed, as illustrated as the processing contents "1". However, the load can be decreased in the case of the processing contents "0". In this way, the processing contents are smoothed so that, with the process needed to be executed with the earliest processing timing by the microcomputer 20 as a reference, the other processes can be executed with different processing timings. Therefore, it is possible to suppress the processing load of the microcomputer 20.

Figure 16:
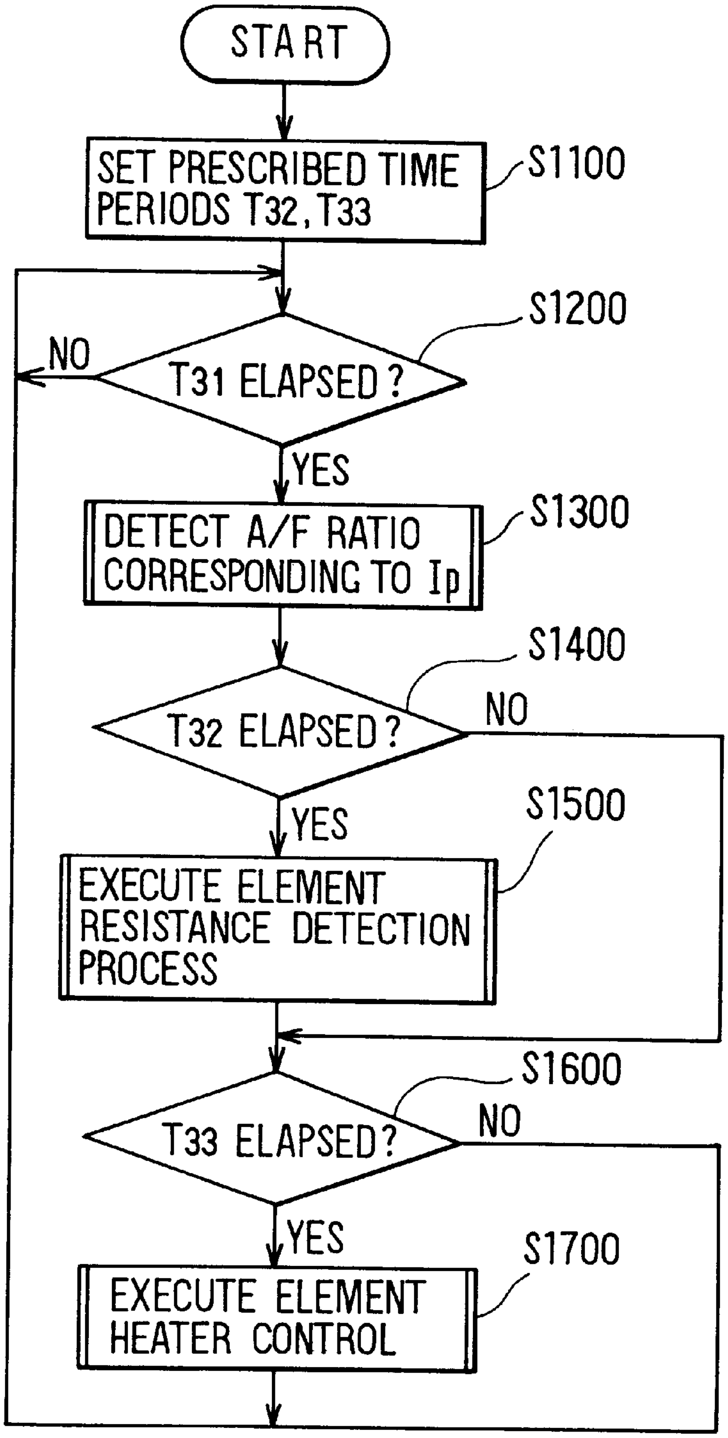
FIG. 16 is a flow diagram illustrating the procedure of executing the element resistance detection process according to the fourth embodiment of the present invention is applied.

Specifically, in FIG. 16, at step S1100, prescribed time periods T32 and T33 are set in the initial stage from the start of the control. Next, at step S1200, it is determined whether a prescribed time period T31 has elapsed from the previous A/F detection time. This prescribed time period T31 is a time period that corresponds to the A/F ratio detection period and, where the processing timing is the earliest, is 4 ms or so. When the prescribed time period T31 has elapsed, the routine proceeds to step S1300 where, as with the same critical current A/F detection process as in step S200 in FIG. 4, the sensor current Ip (critical current) detected by the current detection circuit 50 is read. The A/F ratio of the internal combustion engine 11 corresponding to the sensor current Ip obtained at this time is detected using the characteristic map that is stored previously in the ROM. At this time, the voltage Vp corresponding to this A/F detected result is applied to the A/F sensor 30 by the use of the characteristic line L1 illustrated in FIG. 2.

Next, the routine proceeds to step S1400 in which it is determined whether the prescribed time period T32 has elapsed. This prescribed time period T32 is a time period that corresponds to the element resistance detection period. In the initial stage from the start of the control, T32 is set to the same time length as that corresponding to the prescribed time period T31. After the A/F sensor 30 has been activated due to a rise in its temperature, T32 is set to be, for example, 128 ms. When it has been determined at step S1400 that the prescribed time period T32 has elapsed, the routine proceeds to step S1500, where the element resistance detection process illustrated in FIG. 5 is executed. It is to be noted that when it has been determined in step S1400 that the prescribed time period T32 has not elapsed, step S1500 is skipped. Next, the routine proceeds to step S1600 where it is determined whether the prescribed time period T33 has elapsed. This prescribed time period T33 is a time period that corresponds to the control period for controlling the element heater. In the initial stage from the start of the control, it is set to be twice as long as the time length corresponding to the prescribed time period T31. After the A/F sensor 30 has been activated due to a rise in its temperature, T33 is set to be, for example, 128 ms. It is to be noted that although each of the prescribed time periods T32 and T33 is the same 128 ms, the processing timings for the element resistance detection process and the element heater control process are slightly deviated from each other so that these processing timings do not become identical. At step S1600, when it has been determined that the prescribed time period T33 has elapsed, the routine proceeds to step S1700 where the element heater control process for controlling the power supplied to the heater 31 is executed to maintain the A/F sensor 30 at a temperature at which the A/F sensor 30 is activated. When the prescribed time period T33 has not elapsed, after step S1700 is skipped, the routine returns to step S1200, whereby steps S1200–S1600 are repeated.

The above-described embodiment is directed to a control method for controlling the A/F sensor 30 for outputting the sensor current corresponding to the A/F ratio in the exhaust gas upon application of the voltage. Namely, this embodiment is directed to differentiating the execution timings for executing the process for detecting the element resistance R of the A/F sensor 30 according to the amount of change in the current ΔI that follows the amount of change in the voltage ΔV, and the process for raising the temperature of the A/F sensor 30.

Accordingly, since smoothing is performed so that, with the A/F detection process being used as a reference, the element resistance detection process and element heater control process can be executed with different processing timings. Therefore, it is possible to suppress the processing load of the microcomputer 20.

Fifth Embodiment

Next, an explanation will be given according to a flow diagram of FIG. 18, which illustrates the procedure of executing the element resistance detection process according to the fifth embodiment of the present invention, and with reference to timing diagrams of FIG. 19. It is to be noted that FIG. 19A illustrates the function of this embodiment, and FIG. 19B is a comparative example illustrating a case where the limitation imposed on the amount of change according to this embodiment is not applied. Also, the schematic construction of the air-fuel ratio detecting apparatus according to this embodiment and the like are the same as in the case of FIGS. 1 to 3, and therefore detailed descriptions thereof will be omitted.

Figure 18:
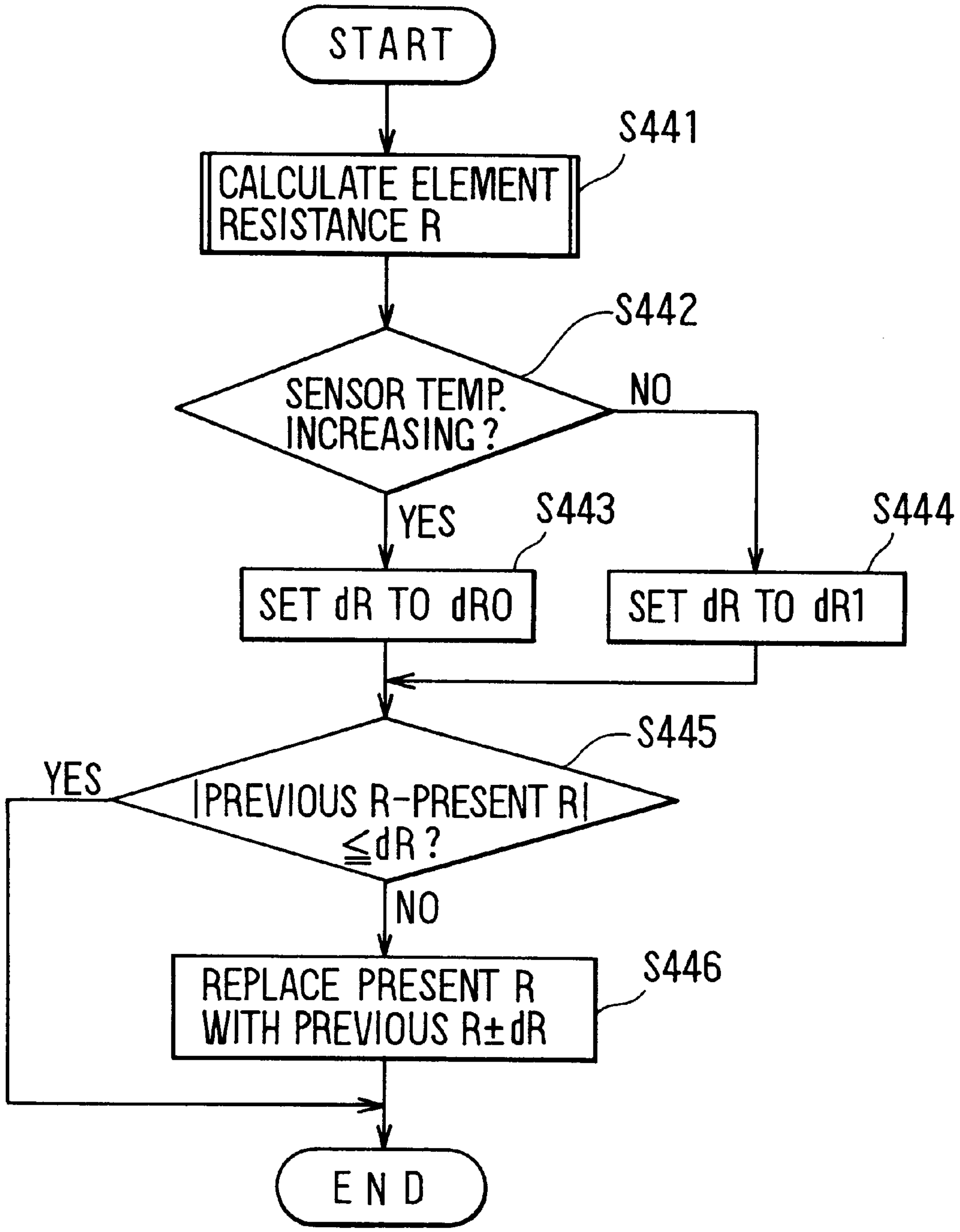
FIG. 18 is a flow diagram illustrating the procedure of executing the element resistance detection process according to the fifth embodiment of the present invention is applied.
Figure 19A:
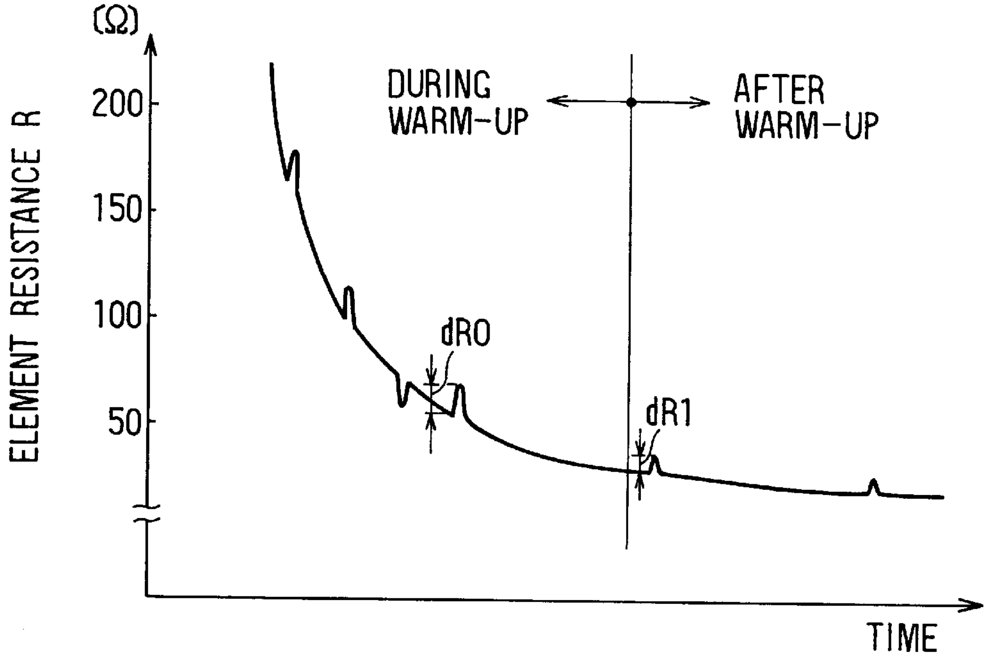
FIGS. 19A and 19B are timing diagrams illustrating in detail the function performed in FIG. 18.
Figure 19B:
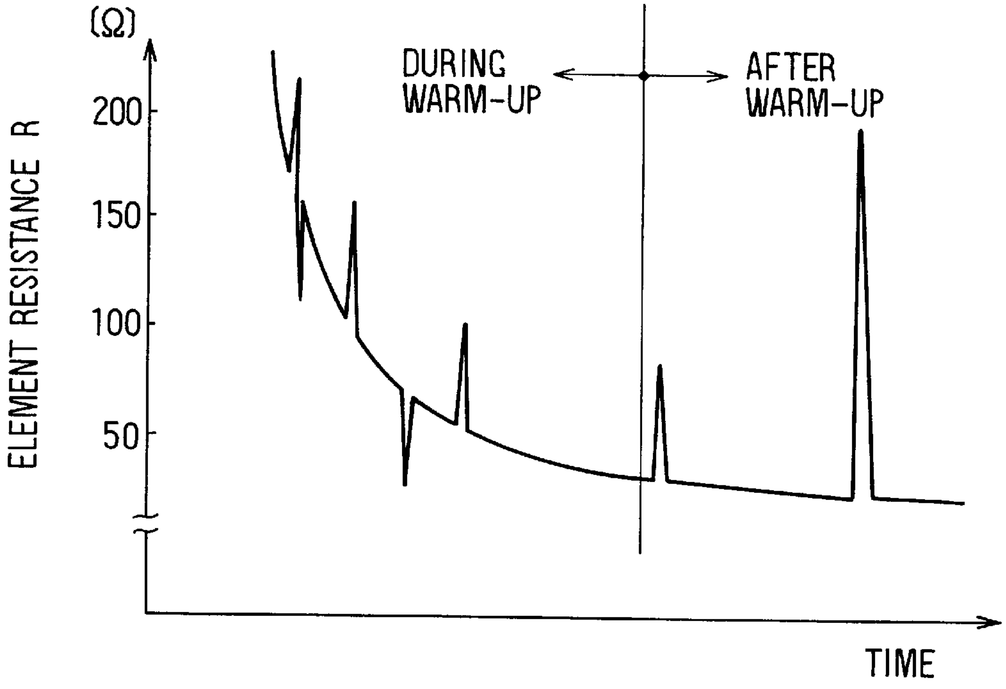

In FIG. 18, first, at step S441, the element resistance detection process illustrated in FIG. 5 is executed, whereby the element resistance R is calculated. Next, the flow proceeds to step S442 where it is determined whether the temperature of the A/F sensor 30 is rising. If the temperature of the A/F sensor 30 is rising, the routine proceeds to step S443 where the limitation value dR, for limiting the amount of change in the element resistance value is set to dR0 (e.g. 50 Ω) (see FIG. 19A). If the temperature of the A/F sensor 30 reaches a value at which the A/F sensor 30 is already activated, the routine proceeds to step S444, where the limitation value dR for limiting the amount of change in the element resistance value is set to dR1 (e.g. 10 Ω). The value dR1 is smaller than the value dR0 that is set when the temperature of the A/F sensor 30 is rising (see FIG. 19A). After either step S443 or S444 has been executed, the flow proceeds to step S445, where it is determined whether the absolute value of a value obtained by subtracting the present element resistance R from the previous element resistance calculated in step S441 is less than the limitation value dR for limiting the amount of change. When this absolute value exceeds the limitation value dR, the routine proceeds to step S446. At step S446, when the present element resistance R is larger than the previous element resistance, and the resulting absolute value is larger than the limitation value dR for limiting the amount of change, the present element resistance R is replaced with a resistance value obtained by adding the limitation value dR to the previous element resistance. on the other hand, when the present element resistance R is smaller than the previous element resistance, and the resulting absolute value is larger than the limitation value dR, the present element resistance R is replaced with a resistance value obtained by subtracting the limitation value dR from the previous element resistance. Thereafter, this routine is ended. Also, when the absolute value is smaller than the limitation value dR, step S446 is skipped, and the present element resistance R calculated in step S441 is left unchanged. Thereafter, this routine is ended.

In this way, the control method of this embodiment controls the A/F sensor 30 for outputting the sensor current corresponding to the A/F ratio in the exhaust gas upon application of a voltage. Namely, this embodiment is directed to limiting the amount of change with respect to the element resistance R detected by the A/F sensor 30 according to the amount of change in the current ΔI that follows the amount of change in the voltage ΔV.

Accordingly, the change in the element resistance R of the A/F sensor 30 is limited to the amount of change in the permissible range, i.e. as illustrated from FIG. 19B to FIG. 19A. As a result, the execution range of control with respect to the A/F sensor 30 falls within a normal execution range. Namely, at the time of detecting the element resistance of the A/F sensor 30, it is possible to prevent the detected element resistance value from varying greatly from a true value due to the fact that the sensor signal is a very small signal. Therefore, noises are superimposed thereon due to conditions such as the operational condition of the internal combustion engine, or the wired condition of the sensor signal. That is, since the change in the element resistance of the A/F sensor 30 is limited to the amount of change in the prescribed range, it is possible for the change in the element resistance not to fall outside a normal range of control. Because the detection of the element resistance is not affected by a very small magnitude of change, there is no effect on the control based on a normal change in the element resistance. Thus, a responsiveness determined according to the heater control and based on such parameters as the detected element resistance is obtained.

Also, this embodiment is directed to changing the amount-of-change limitation value dR according to prescribed conditions. Accordingly, the element resistance R of the A/F sensor 30 can be rounded by an appropriate permissible range of its amount of change in accordance with the condition of use of the element. For this reason, the limitation values dR0 and dR1 can be changed according to, for example, the operational condition of the internal combustion engine, and not according to the rising operation in temperature of the A/F sensor 30. Therefore, it is possible to execute a stable control with respect to the A/F sensor 30.

And, according to this embodiment, when the temperature of the A/F sensor 30 is rising, the amount-of-change limitation value dR is set to be large. After the rise in the temperature of the A/F sensor 30, dR is set to be small. Namely, by changing the permissible range of the amount of change of the element resistance R during a rise in temperature thereof and after the rise in temperature thereof, it is possible to execute a stable control of the A/F sensor 30 while realizing an early activation demanded of the A/F sensor 30.

Figure 20:
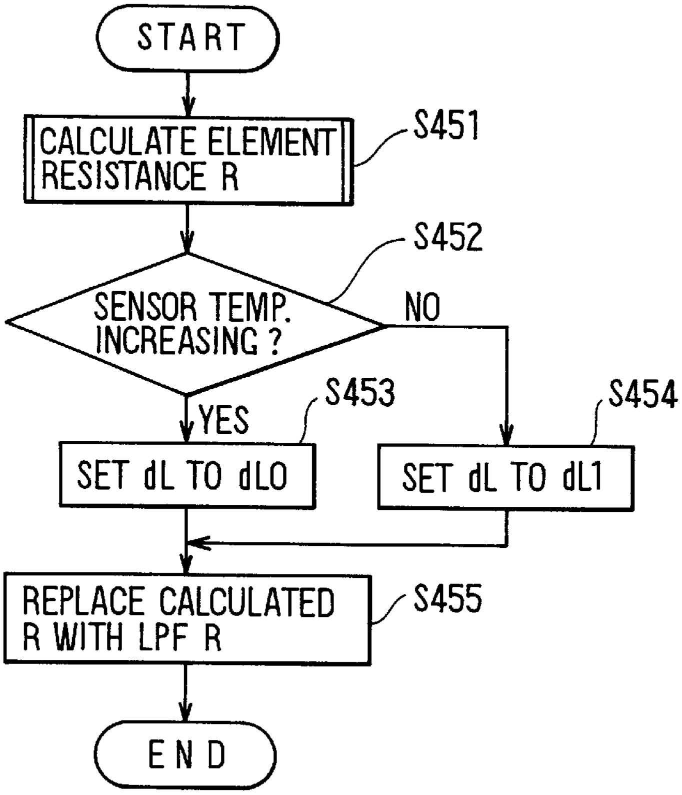
FIG. 20 is a flow diagram illustrating the procedure of executing the element resistance detection process according to the sixth embodiment of the present invention is applied.
Figure 21:
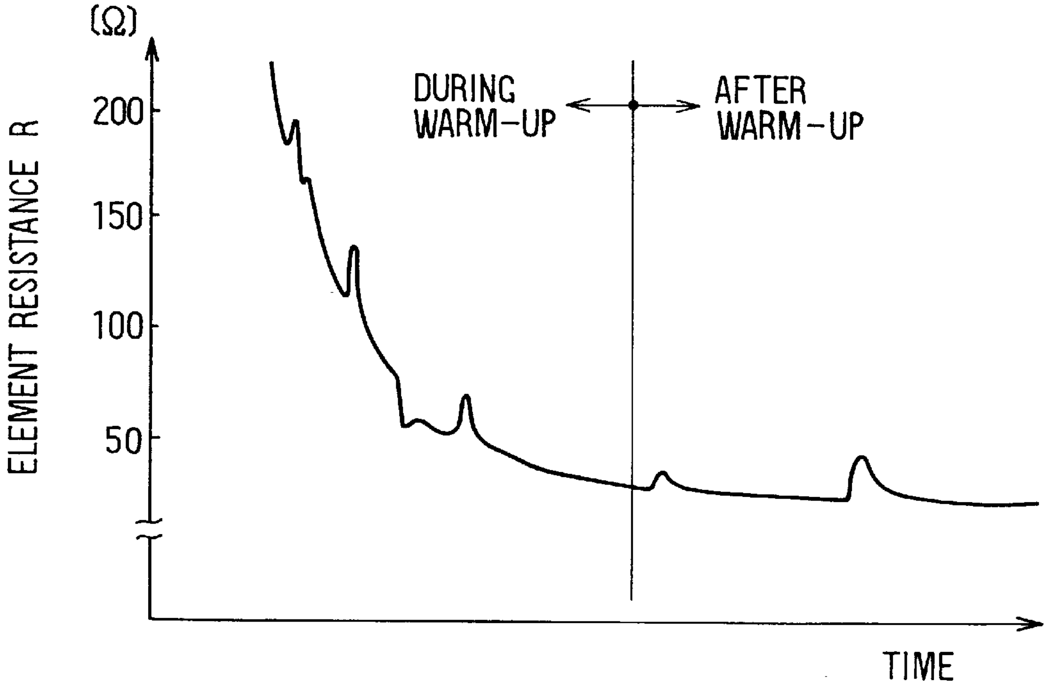
FIG. 21 is a timing diagram illustrating in detail the function performed in FIG. 20.

Next, an explanation will be given according to a flow chart of FIG. 20 illustrating the procedure of executing the element resistance detection process for the control method according to the sixth embodiment of the present invention, and with reference to a time chart of FIG. 21. It is to be noted that the schematic construction of the air-fuel ratio detecting apparatus according to this embodiment and the like are the same as in the case of FIGS. 1 to 3, and therefore detailed descriptions thereof will be omitted.

In FIG. 20, at step S451, the element resistance detection process illustrated in FIG. 5 is executed, whereby the element resistance R is calculated. Next, the routine proceeds to step S452 where it is determined whether the temperature of the A/F sensor 30 is rising. When the temperature of the A/F sensor 30 is rising, the routine (low pass filter) is set to dL0 (refer to somewhat large fluctuations of the element resistance R during the rise in the temperature illustrated in FIG. 21). On the other hand, when the temperature of the A/F sensor 30 is after the rise therein, i.e. reaches an activation temperature at which the A/F sensor 30 is already activated, the routine proceeds to step S454, where the time constant dL of the LPF is set to dL1 (refer to small fluctuations of the element resistance R after the rise in temperature illustrated in FIG. 21). After completion of the processing in step S453 or S454, the routine proceeds to step S455 and the element resistance R calculated in step S451 is replaced with an element resistance R obtained after finishing the processing of the LPF. Thereafter, this routine is ended.

Thus, this embodiment is directed to embodying the invention as the control method for controlling the A/F sensor 30 for outputting the sensor current corresponding to the A/F ratio in the exhaust gas upon application of a voltage. Namely, this embodiment is directed to passing the A/F sensor signal through the LPF, with respect to the element resistance R detected by the A/F sensor 30, according to the amount of change in the current ΔI that follows the amount of change in the voltage ΔV.

Accordingly, the change in the element resistance R of the A/F sensor 30 is limited to the amount of change in the permissible range. Therefore, the execution range of control with respect to the A/F sensor 30 can fall within a normal execution range. Namely, at the time of detecting the element resistance of the A/F sensor 30, it is possible to prevent the detected element resistance value from varying greatly from a true value due to the fact that the sensor signal is a very small signal. Therefore, noises are superimposed thereon due to conditions such as the operational condition of the internal combustion engine, and the wired condition of the sensor signal. That is, since the sensor signal is passed through the LPF sufficiently responsive to a change in the element resistance of the A/F sensor 30, it is possible for the change in the element resistance not to fall outside a normal range of control. And, since the detection of the element resistance is not affected by a very small magnitude of change, no effect is had on the control based on a normal change in the element resistance. As a result, a responsiveness that is determined according to the heater control based on such parameters as detected element resistance is obtained.

Also, this embodiment is directed to changing the time constant dL of the LPF according to prescribed conditions. Accordingly, the time constant of the LPF is changed so that the element resistance R of the A/F sensor 30 may be sufficiently responsive to a normal change in the element resistance in accordance with the condition of use of the element. Namely, the time constants dL0 and dL1 of the LPF, through which the sensor signal is passed for detecting the element resistance, are changed according to, for example, the operational condition of the internal combustion engine 11, and not according to the state of rise in temperature of the A/F sensor 30. Thus, it is possible to execute a stable control with respect to the A/F sensor 30.

Also, according to this embodiment, when the temperature of the A/F sensor 30 is rising, the time constant of the LPF is set to be large. After the rise in the temperature of the A/F sensor 30, the time constant is set to be small. Namely, by switching the LPF to be sufficiently responsive to the change in the element resistance during the rise in temperature of the A/F sensor 30, and by switching the LPF to be sufficiently responsive to the change in the element resistance after the rise in temperature of the A/F sensor 30, it is possible to execute a stable control of the A/F sensor 30 while realizing an early activation demanded of the A/F sensor 30.

Seventh Embodiment

Next, an explanation will be given according to the flow diagram of FIG. 22, which illustrates the procedure for executing the element resistance detection process to which the control method for controlling the A/F sensor according to the seventh embodiment of the present invention is applied, with reference to the timing diagram of FIG. 23. It is to be noted that the schematic construction of the air-fuel ratio detecting apparatus according to this embodiment and the like are the same as in the case of FIGS. 1 to 3, and therefore detailed descriptions thereof will be omitted.

Figure 22:
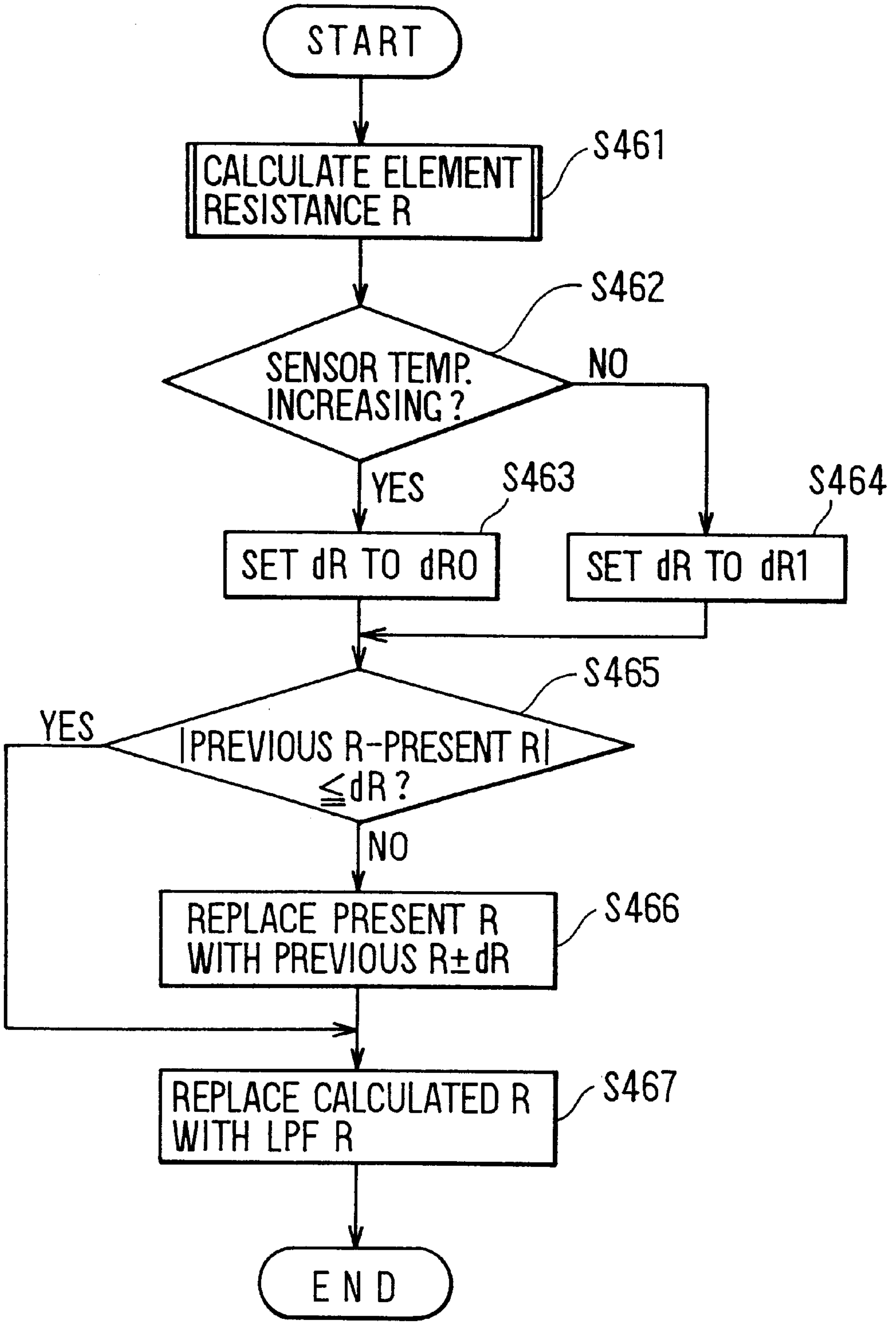
FIG. 22 is a flow diagram illustrating the procedure of executing the element resistance detection process according to the seventh embodiment of the present invention is applied.
Figure 23:
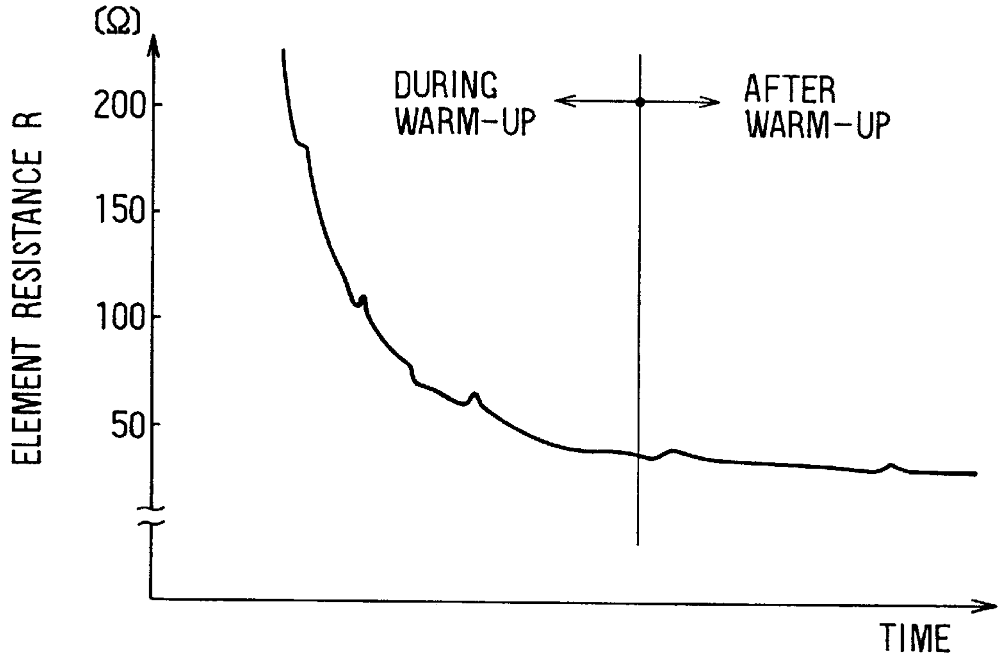
FIG. 23 is a timing diagram illustrating in detail the function performed in FIG. 22.

In FIG. 22, at step S461, the element resistance detection process illustrated in FIG. 5 is executed, whereby the element resistance R is calculated. Next, the routine proceeds to step S462 in which it is determined whether the temperature of the A/F sensor 30 is increasing. When the temperature of the A/F sensor 30 is rising, the flow proceeds to step S463 in which the limitation value dR for limiting the amount of change in the detected element resistance value is set to dR0 (e.g. 50 Ω) (refer to somewhat large fluctuations of the element resistance R during the rise in the temperature illustrated in FIG. 23). On the other hand, when the temperature of the A/F sensor 30 reaches a value at which the A/F sensor 30 is already activated, the routine proceeds to step S464 where the limitation value dR for limiting the amount of change in the detected element resistance value is set to dR1 (e.g. 10 Ω), which is smaller than the dR0 (refer to small fluctuations of the element resistance R after the rise in temperature illustrated in FIG. 23). After the processing of step S463 or S464 has been executed, the routine proceeds to step S465 where it is determined whether the absolute value of a value obtained by subtracting from the previous element resistance the present element resistance R calculated in step S461 is less than or equal to the limitation value dR. When this absolute value exceeds the limitation value dR for limiting the amount of change, the routine proceeds to step S466. In step S466, when the present element resistance R is larger than the previous element resistance, and the resulting absolute value is larger than the limitation value dR, the present element resistance R is replaced with a resistance value obtained by adding the limitation value dR to the previous element resistance. On the other hand, when the present element resistance R is smaller than the previous element resistance, and the resulting absolute value is larger than the limitation value dR, the present element resistance R is replaced with a resistance value obtained by subtracting the limitation value dR from the previous element resistance. On the other hand, when the absolute value is smaller than the limitation value dR, step S466 is skipped, and the present element resistance R calculated in step S461 is left unchanged. Next, the routine proceeds to step S467 where the calculated element resistance R is replaced with the element resistance R obtained after the processing of the LPF. Thereafter, this routine is ended.

In this way, this embodiment is directed to the control method for controlling the A/F sensor 30 for outputting the sensor current corresponding to the A/F ratio in the exhaust gas upon application of the voltage. Namely, this embodiment is directed to limiting the amount of change with respect to the element resistance R detected by the A/F sensor 30 according to the amount of change in the current ΔI that follows the amount of change in the voltage ΔV, and also to passing the sensor signal through the LPF.

Accordingly, the change in the element resistance R of the A/F sensor 30 is limited to the amount of change in the permissible range. In addition, the change in element resistance is LPF processed, with the result that the execution range of control with respect to the A/F sensor 30 can fall within a normal execution range. Namely, at the time of detecting the element resistance of the A/F sensor 30, it is possible to prevent the detected element resistance value from becoming greatly different from a true value, as the sensor signal is a very small signal. Therefore noises are superimposed thereon due to operational conditions such as the condition of the internal combustion engine, or the wired condition of the sensor signal. That is, since the change in the element resistance of the A/F sensor 30 is limited to the amount of change in the prescribed range, and in addition is subjected to LPF processing, as the LPF is sufficiently responsive to the change in the element resistance, it is possible for the change in the element resistance not to fall outside a normal range of control. And, since the detection of the element resistance is not affected by a very small magnitude of change, no effect is had on the control based on a normal change in the element resistance. As a result, a responsiveness is obtained that is determined according to the heater control based on parameters such as the detected element resistance.

Eighth Embodiment

Figure 24:
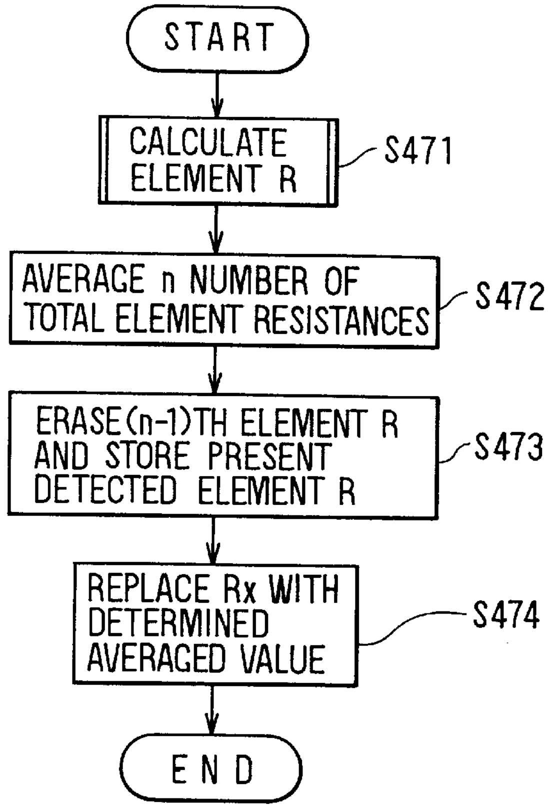
FIG. 24 is a flow diagram illustrating the procedure of executing the element resistance detection process according to the eighth embodiment of the present invention is applied.
Figure 25:
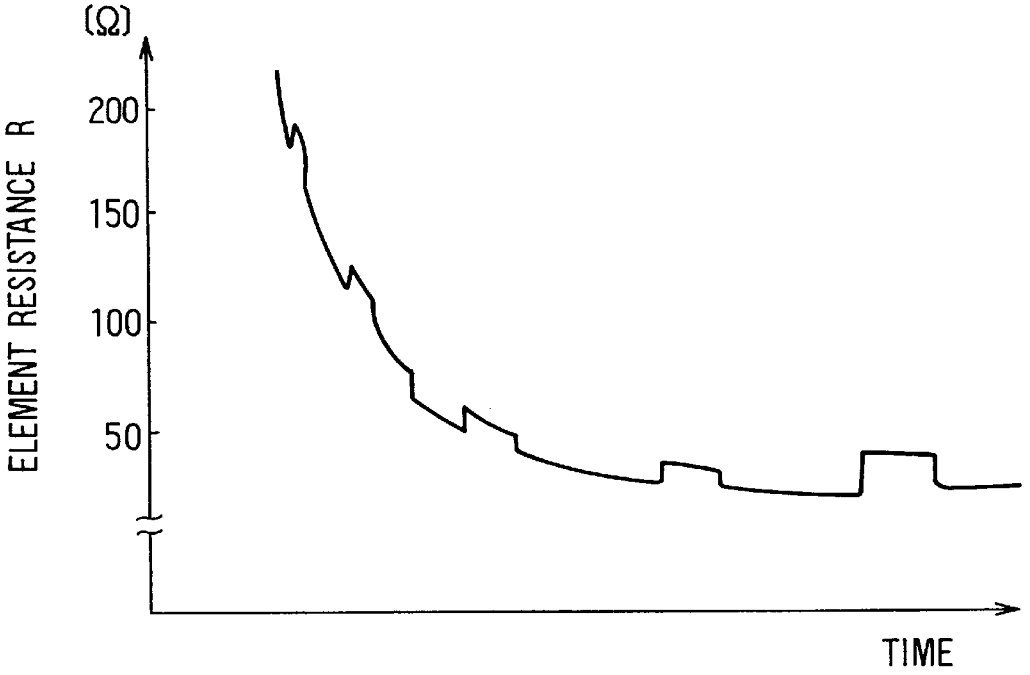
FIG. 25 is a timing diagram illustrating in detail the function performed in FIG. 24.

Next, an explanation will be given according to a flow chart of FIG. 24 illustrating the procedure of executing the element resistance detection process in the control method for controlling the A/F sensor according to the eighth embodiment of the present invention, with reference to a timing diagram of FIG. 25. It is to be noted that the schematic construction of the air-fuel ratio detecting apparatus according to this embodiment and the like are the same as in the case of FIGS. 1 to 3, and therefore detailed descriptions thereof will be omitted.

In FIG. 24, at step S471, the element resistance detection process illustrated in FIG. 5 is executed, whereby the element resistance R is calculated. Next, the routine proceeds to step S472 where an n number of element resistances, obtained by adding the element resistances totaled up to the (n−1)th element resistance to the present detected element resistance, are averaged (refer to small prescribed-width fluctuations of the element resistance R illustrated in FIG. 25). Next, the routine proceeds to step S473 where the (n−1)th element resistance is erased and the present detected element resistance is stored. Next, the routine proceeds to step S474 where the element resistance Rx is replaced with the by-averaging determined value. Thereafter, this routine is ended.

In this way, this embodiment is directed to a control method for controlling the A/F sensor 30 for outputting the sensor current corresponding to the A/F ratio in the exhaust gas upon application of a voltage. Namely, this embodiment is directed to averaging a plurality of element resistances detected by the A/F sensor 30 according to the amount of change in the current ΔI that follows the amount of change in the voltage ΔV.

Accordingly, the changes in the element resistance R of the A/F sensor 30 are averaged, whereby the effect of abnormal data is suppressed. As a result, the execution range of control with respect to the A/F sensor 30 can fall within a normal execution range. Namely, at the time of detecting the element resistance of the A/F sensor 30, it is possible to prevent the detected element resistance value from varying greatly from a true value due, as the sensor signal is a very small signal. Therefore noises are superimposed thereon due to conditions such as the operational condition of the internal combustion engine or wired condition of the sensor signal. That is, since the changes in the element resistance of the A/F sensor 30 are averaged, it is possible for the change in the element resistance not to fall outside a normal range of control. Since the detection of the element resistance is not affected by a very small magnitude of change, no effect is had on the control based on a normal change in the element resistance. As a result, a responsiveness is obtained that is determined according to the heater control based on parameters such as the detected element resistance.

Ninth Embodiment

Figure 26:
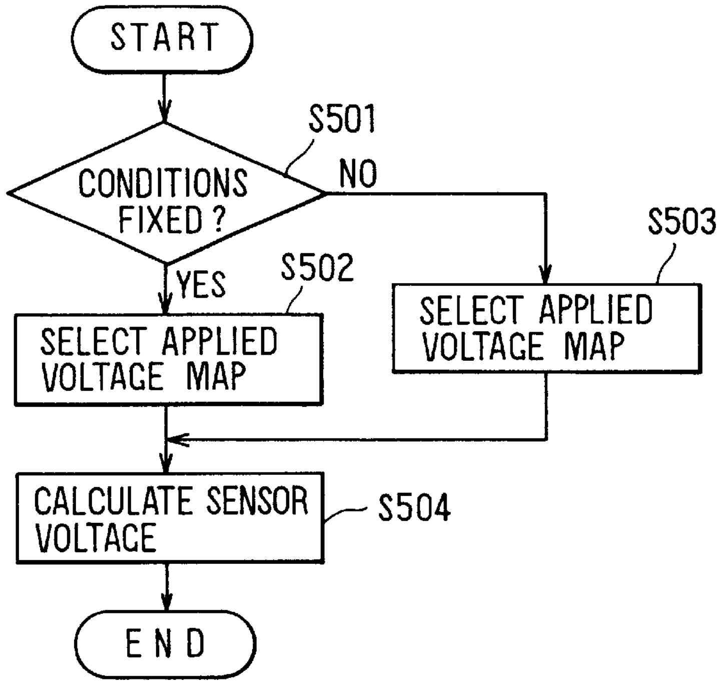
FIG. 26 is a flow diagram illustrating the procedure of executing the element resistance detection process according to the ninth embodiment of the present invention is applied.
Figure 27A:
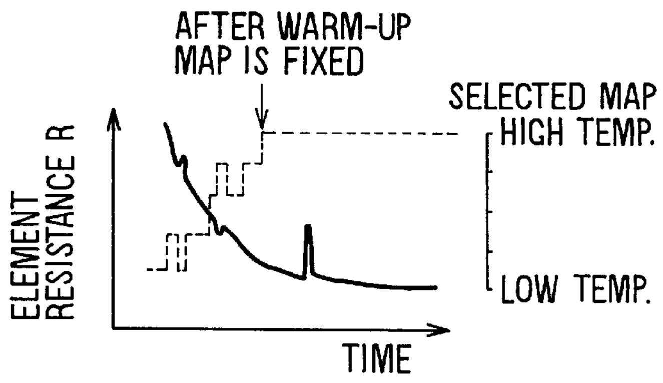
FIGS. 27A and 27B are timing diagrams illustrating in detail the function performed in FIG. 26.
Figure 27B:
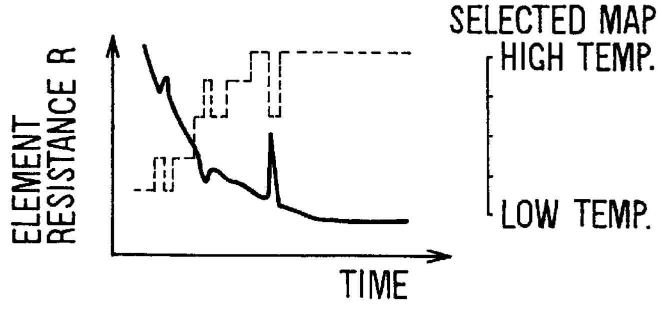

Next, FIG. 26 illustrates the procedure of executing the element resistance detection process according to the ninth embodiment of the present invention is applied, and with reference to the timing diagrams of FIGS. 27A and 27B. It is to be noted that FIG. 27A illustrates the function of this embodiment, and FIG. 27B illustrates a comparative example of a case where no limitation is imposed on the map selection range of this embodiment. Also, the schematic construction of the air-fuel ratio detecting apparatus according to this embodiment and the like are the same as in the case of FIGS. 1 to 3, and therefore detailed descriptions thereof will be omitted.

In FIG. 26, at S501, it is determined whether the conditions under which an applied voltage map for calculating the voltage applied when detecting the present A/F ratio are fixed. Here, it is determined whether the element resistance falls, for example, below 50 Ω due to a rise in temperature, with the result that the A/F sensor 30 is almost in an activated state. When the determination condition in step S501 is satisfied, the routine proceeds to step S502 where the applied voltage map available after the fixing conditions are satisfied is selected (refer to the fixation of the map selection made after the rise in temperature illustrated in FIG. 27A). On the other hand, when the determination condition in step S501 is not satisfied, the routine proceeds to step S503 where the applied voltage map is selected according to the detected element resistance. After the processing of step S502 or S503, the routine proceeds to step S504 where the voltage applied to the A/F sensor 30 is calculated according to the selected applied voltage map, after which this routine is ended.

In this way, this embodiment is directed to the control method for controlling the A/F sensor 30 for outputting the sensor current corresponding to the A/F ratio in the exhaust gas upon application of the voltage. Namely, this embodiment is directed to limiting the map selection range after the rise in temperature of the A/F sensor 30 when changing the voltage applied to the A/F sensor 30 at the time of detecting the A/F ratio thereof, according to the map preset using the element resistances R of the A/F sensor 30 as parameters.

While the voltage applied to the A/F sensor 30 at the time of detecting the A/F ratio is changed according to the map using the element resistances R as parameters, the execution range of control with respect to the A/F sensor 30 can fall within a normal execution range, as the map is fixed by determining that, after the rise in temperature, the change in the element resistance R is small. Namely, at the time of detecting the element resistance of the A/F sensor 30, it is possible to prevent the voltage applied to the sensor from becoming abnormal. As a result, it is possible to prevent the detected oxygen concentration value from becoming different from a true value due to the fact that the sensor signal is a very small signal. Therefore noises are superimposed thereon due to conditions such as the operational condition of the internal combustion engine, and the wired condition of the sensor signal. Therefore, the detected element resistance value differs from a true value. That is, since large changes in the element resistance of the A/F sensor 30 are ignored after the completion of the rise in temperature, it is possible for the change in the element resistance not to fall outside a normal range of control.

Tenth Embodiment

Figure 29:
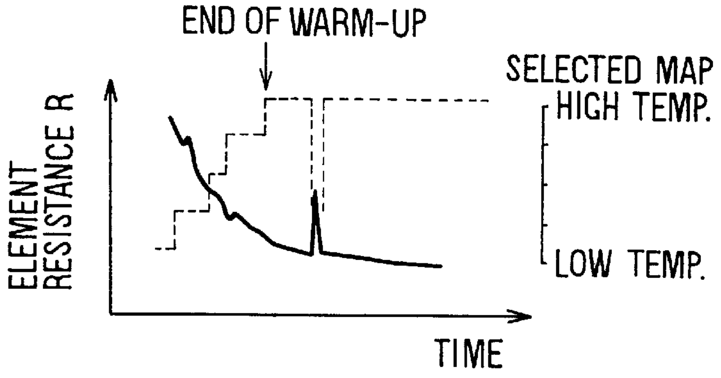
FIG. 29 is a timing diagram illustrating in detail the function performed in FIG. 28.

Next, an explanation will be given in view of the flow diagram of FIG. 28, which illustrates the procedure of executing the element resistance detection process according to the tenth embodiment of the present invention is applied, with reference to the timing diagram of FIG. 29. It is to be noted that the schematic construction of the air-fuel ratio detecting apparatus according to this embodiment and the like are the same as in the case of FIGS. 1 to 3, and therefore detailed descriptions thereof will be omitted.

In FIG. 28, first, at S511, it is determined whether the present element resistance is greater than or equal to the previous element resistance. Here, the element resistances detected at the time of the previous and present applied voltage map selections are compared with each other, and determination is made of the direction in which the element resistance changes. When the element resistance is increasing, the routine proceeds to step S512, and the applied voltage map is selected according to the applied voltage selection standard for an increasing element resistance (refer to a transfer of the map selection illustrated in FIG. 29 toward the high temperature side). On the other hand, when the element resistance is decreasing, the routine proceeds to step S513, and the applied voltage map is selected according to the applied voltage selection standard for a decreasing element resistance (refer to a stability of the map selection illustrated in FIG. 29). After the applied voltage selection processing of step S512 or S513, the routine proceeds to step S514 where the voltage applied to the A/F sensor 30 is calculated according to the selected applied voltage map. Next, the routine proceeds to step S515 where the element resistance used for the present applied voltage map selection is stored for the next applied voltage map selection, after which this routine is ended.

The above embodiment is directed to the control method for controlling the A/F sensor 30 for outputting the sensor current corresponding to the A/F ratio in the exhaust gas upon application of a voltage. Namely, this embodiment is directed to providing a hysteresis with respect to determining the map selection when changing the voltage applied to the A/F sensor 30 at the time of detecting the A/F ratio thereof, according to the map preset using the element resistances R of the A/F sensor 30 as parameters.

The voltage applied to the A/F sensor 30 at the time of detecting the A/F ratio thereof is changed according to the map using the element resistances R as parameters. A map selection is made based on the fact that the element resistance of the A/F sensor 30 ordinarily gradually decreases due to a rise in temperature. Therefore, correct map selection can be made according to the direction in which the element resistance changes. As a result, the execution range of control with respect to the A/F sensor 30 can fall within a normal execution range. Namely, at the time of detecting the element resistance of the A/F sensor 30, it is possible to prevent the voltage applied to the sensor from becoming abnormal. As a result, it is possible to prevent the detected oxygen concentration value from varying from a true value due to the fact that the sensor signal is a very small signal, therefore causing noises to be superimposed thereon due to conditions such as the operational condition of the internal combustion engine, and the wired condition of the sensor signal, and therefore causing the detected element resistance value to differ from a true value. That is, since large changes in the element resistance of the A/F sensor 30 are ignored, it is possible for the change in the element resistance not to fall outside a normal range of control.

Eleventh Embodiment

Figure 31:
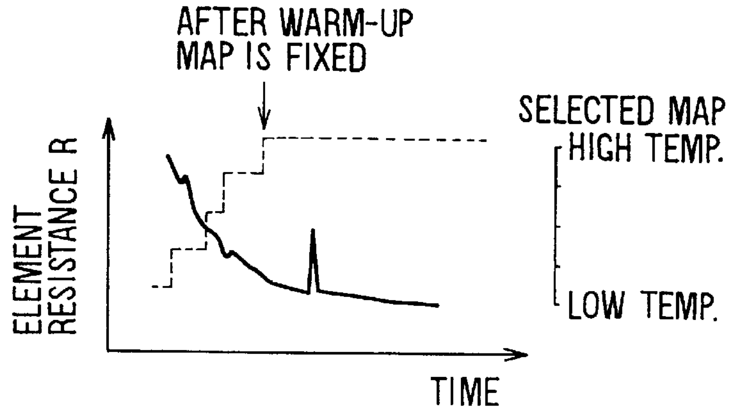
FIG. 31 is a timing diagram illustrating in detail the function performed in FIG. 30; and, FIGS. 32A–32B are waveform diagrams illustrating conventional element resistance detection signals according to the prior art.

Next, an explanation will be given according to the flow diagram of FIG. 30, which illustrates the procedure of executing the element resistance detection process in the method for controlling the A/F sensor according to the eleventh embodiment of the present invention, with reference to the timing diagram of FIG. 31. It is to be noted that the schematic construction of the air-fuel ratio detecting apparatus according to this embodiment and the like are the same as in the case of FIGS. 1 to 3, and therefore detailed descriptions thereof will be omitted.

Figure 30:
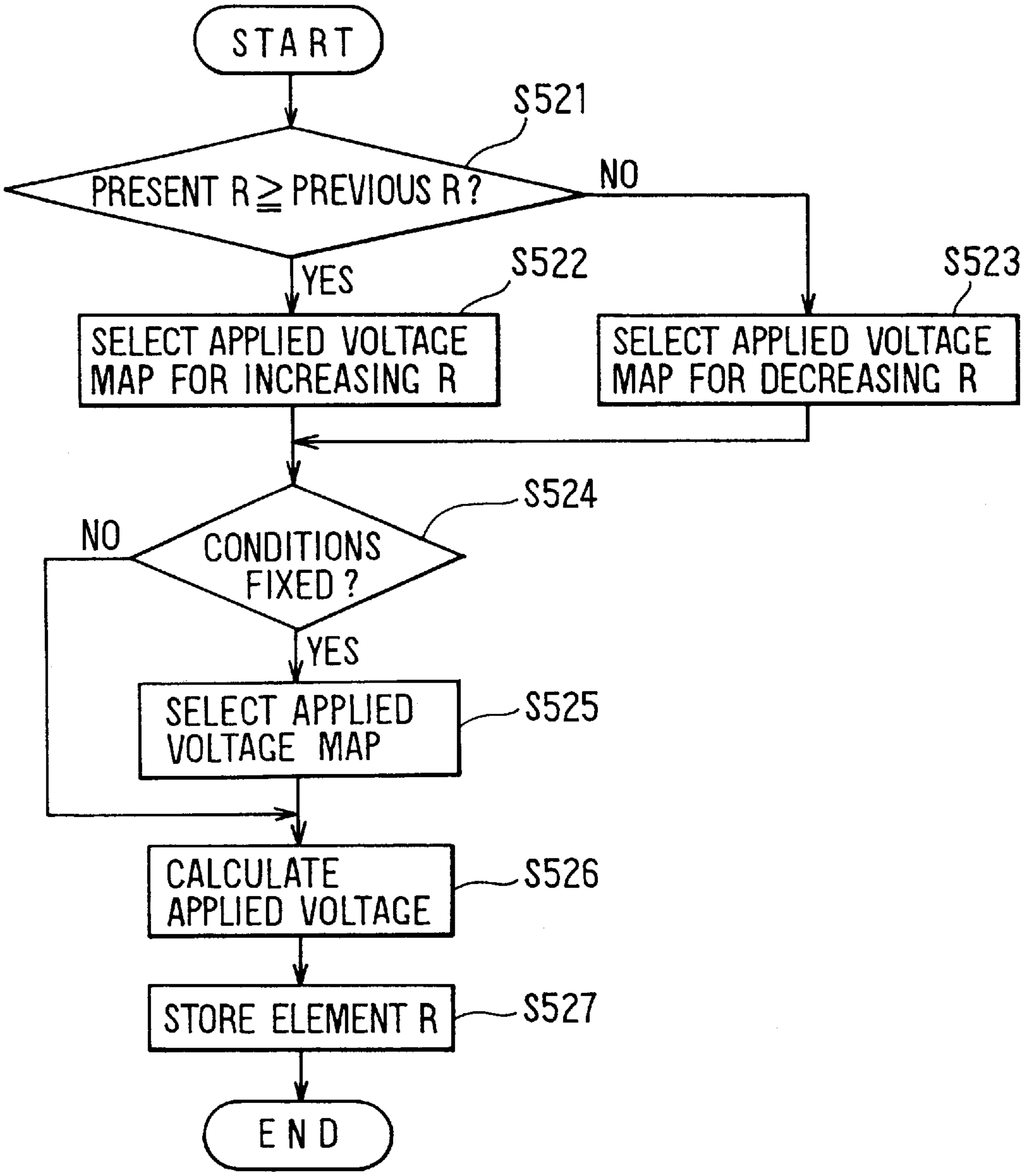
FIG. 30 is a flow diagram illustrating the procedure of executing the element resistance detection process according to the eleventh embodiment of the present invention is applied.

In FIG. 30, first, in step S521, it is determined if the present element resistance is greater than or equal to the previous element resistance. Here, the element resistances detected at both the time of the present and previous applied voltage map selections are compared , and a determination is made of the direction in which the element resistance changes. When the element resistance is increasing, the routine proceeds to step S522, and the applied voltage map is selected according to the applied voltage selection standard for an increasing element resistance (refer to a transfer of the map selection illustrated in FIG. 31 toward the high temperature side). On the other hand, when the element resistance is decreasing, the routine proceeds to step S523, and the applied voltage map is selected according to the applied voltage selection standard for decreasing element resistance (refer to a stability of the map selection illustrated in FIG. 31).

After the applied voltage map selection processing of step S522 or S523, the routine proceeds to step S524 and it is determined whether the conditions under which an applied voltage map for calculating the voltage applied when detecting the A/F ratio by the A/F sensor 30 by using the presently detected element resistance as a parameter are fixed. Here, it is determined whether the element resistance decreases, for example, below 50 Ω due to a rise in temperature, with the result that the A/F sensor 30 is almost in an already activated state. When the determination condition in step S524 is satisfied, the routine proceeds to step S525, and the applied voltage map available after the fixing conditions are satisfied is selected (refer to the fixation of the map selection made after the rise in temperature illustrated in FIG. 31). On the other hand, when the determination condition in step S524 is not satisfied, step S525 is skipped. Next, the routine proceeds to step S526 and the voltage applied to the A/F sensor 30 is calculated according to the selected applied voltage map. Next, the routine proceeds to step S527, and the element resistance used for the presently selected applied voltage map is stored for the next applied voltage map selection, after which this routine is ended.

In this way, this embodiment is directed to embodying the invention as the control method for controlling the A/F sensor 30 for outputting the sensor current corresponding to the A/F ratio in the exhaust gas upon application of a voltage. Namely, this embodiment is directed to providing a hysteresis for determining the map selection when changing the voltage applied to the A/F sensor 30 at the time of detecting the A/F ratio thereof according to the map preset, using the element resistances R of the A/F sensor 30 as parameters, and also to limiting the map selection range after the rise in temperature of the A/F sensor 30.

While the voltage applied to the A/F sensor 30 at the time of detecting the A/F thereof is changed according to the map using the element resistances R as parameters, the execution range of control with respect to the A/F sensor 30 can fall within a normal execution range. This is possible because a map selection can be based in part on the fact that the element resistance of the A/F sensor 30 ordinarily gradually decreases due to a rise in temperature. Thus, map selection may be made according to the direction in which the element resistance changes, and, since after the rise in temperature the map is fixed, by determining the change in the element resistance R as being small. Namely, at the time of detecting the element resistance of the A/F sensor 30, it is possible to prevent the voltage applied to the sensor from becoming abnormal and, as a result, prevent the detected oxygen concentration value from becoming different from a true value due to the fact that the sensor signal is a very small signal, and therefore noises are superimposed thereon due to conditions such as the operational condition of the internal combustion engine, and the wired condition of the sensor signal. Therefore the detected element resistance value differs from a true value. That is, since the direction in which the element resistance changes is taken into consideration during the rise in temperature of the A/F sensor 30, and large changes in the element resistance of the A/F sensor 30 are ignored after the rise in temperature, it is possible for the change in the element resistance not to fall outside a normal range of control.

While in the above-described embodiments the invention has been explained by taking as an example the control method for controlling the oxygen concentration sensor for detecting the oxygen concentration as the current signal corresponding to the oxygen concentration signal, this oxygen concentration sensor may be a 1-cell critical current type oxygen concentration sensor or a 2-cell critical current type oxygen concentration sensor.

Also, the present invention can be similarly applied in the same way as in the case of the oxygen concentration sensor as a control method for controlling other sensors which are directed to detecting the concentration of gases such as NOx, HC, CO and the like.

What is claimed is:

1. A method of controlling a gas concentration sensor that generates a sensor current signal related to a detected gas concentration, said method comprising:

(i) selectively changing a voltage provided to the sensor during a sensor resistance detection cycle with a range of applied voltages which can substantially obtain a critical current value according to a gas concentration during the sensor resistance detection cycle;

(ii) detecting a change in a sensor current signal resulting from (i);

(iii) detecting resistance of the sensor based on (ii);

(iv) holding a sensor gas concentration signal that is generated substantially just before (i);

(v) interrupting output of a current sensor gas concentration signal to inhibit generation of an erroneous gas concentration signal during (i); and (vi) outputting the held sensor gas concentration signal during (i).

2. The method of claim 1, wherein the step of interrupting the change in the sensor gas concentration signal comprises the step of holding the sensor gas concentration signal, detected prior to the step of selectively changing a voltage, for a predetermined time period both before, and after, the step of selectively changing a voltage, to inhibit generation of erroneous gas concentration signals during the step of selectively changing a voltage.

3. A method of controlling a gas concentration sensor that generates a sensor current signal related to a detected gas concentration, said method comprising:

(i) selectively changing a voltage provided to the sensor during a sensor resistance detection cycle with a range of applied voltages which can substantially obtain a critical current value according to a gas concentration during the sensor resistance detection cycle;

(ii) detecting a change in a sensor current signal resulting from (i);

(iii) detecting resistance of the sensor based on (ii);

(iv) continuously outputting a sensor gas concentration signal; and (v) outputting an inhibition signal for inhibiting use of a current sensor gas concentration signal to inhibit generation of an erroneous gas concentration signal during (i).

4. A method of controlling a gas concentration sensor that generates a sensor current signal related to a detected gas concentration, said method comprising:

(i) selectively changing a voltage provided to the sensor during a sensor resistance detection cycle within a range of applied voltages which can substantially obtain a critical current value according to a gas concentration during the sensor resistance detection cycle;

(ii) detecting a change in a sensor current signal resulting from (i);

(iii) detecting a resistance of the sensor based on (ii);

(iv) holding a sensor gas concentration signal that is generated substantially just before (i);

(v) continuously outputting a sensor gas concentration signal;

(vi) outputting an inhibition signal for inhibiting use of a current sensor gas concentration signal to inhibit generation of an erroneous gas concentration signal during (i); and (vii) outputting the held sensor gas concentration signal during (i).

5. A method of processing a signal relevant to a gas concentration sensor that generates a sensor current corresponding to a detected gas concentration, said method comprising:

(i) detecting a gas concentration corresponding to a sensor critical current;

(ii) selectively changing a voltage provided to a sensor during a sensor resistance detection cycle within a range of applied voltages which can substantially obtain a critical current value according to a gas concentration during the sensor resistance detection cycle;

(iii) detecting a change in a sensor current signal resulting from (ii);

(iv) detecting a resistance of the sensor based on (iii); and (v) controlling a temperature of the sensor, wherein a time interval is provided between (ii) and (v) whereby processing load due to said detecting and controlling the steps is minimized.

6. A method of controlling a gas concentration sensor that generates a sensor current signal related to a detected gas concentration, comprising the steps of:

selectively changing a voltage provided to a sensor during a sensor resistance detection cycle;

detecting a change in a sensor current signal resulting from the step of selectively changing a voltage;

detecting a sensor resistance based on the step of detecting a change in a sensor current signal; and changing the sensor resistance according to predetermined sensor operating parameters in response to the step of detecting a sensor resistance; and limiting sensor resistance change in the step of changing the sensor resistance according to the predetermined operating parameters.

7. The method of claim 6, wherein the step of limiting sensor resistance change enables a large change when a sensor temperature is increasing, and enables only a small change when the sensor temperature has reached a predetermined temperature.

8. A method of controlling a gas concentration sensor that generates a sensor current signal related to a detected gas concentration, comprising the steps of:

selectively changing a voltage provided to a sensor during a sensor resistance detection cycle;

detecting a change in a sensor current signal resulting from the step of selectively changing a voltage;

detecting a sensor resistance value based on the step of detecting a change in a sensor current signal; and filtering the sensor resistance value to create a filtered sensor resistance;

changing filtering parameters in the step of filtering to limit an amount of change of the sensor resistance to maintain the sensor resistance within a predetermined range.

9. A method of controlling a gas concentration sensor that generates a sensor current signal related to a detected gas concentration, comprising the steps of:

selectively changing a voltage provided to a sensor during a sensor resistance detection cycle;

detecting a change in a sensor current signal resulting from the step of selectively changing a voltage;

detecting a sensor resistance value based on the step of detecting a change in a sensor current signal;

determining if an absolute difference between a sensor resistance value, detected during the step of detecting a sensor resistance value, and a previous sensor resistance value is less than or equal to a given incremental resistance value;

adding the incremental resistance value to the present resistance value if the absolute value of the difference is less than or equal to the incremental resistance value; and retaining the sensor resistance value if the absolute value of the difference is greater than the incremental resistance value.

10. A method of controlling a gas concentration sensor that generates a sensor current signal related to a detected gas concentration, comprising the steps of:

a) selectively changing a voltage provided to a sensor during a sensor resistance detection cycle;

b) detecting a change in a sensor current signal resulting from the step of selectively changing a voltage;

c) detecting a sensor resistance value based on the step of detecting a change in a sensor current signal;

d) repeating steps a)–c) a plurality of times;

e) averaging a plurality of sensor resistance values detected during the plurality of times that step c) is repeated; and f) adjusting the sensor resistance based on an average sensor resistance value determined in step e).

11. The method of claim 10, wherein the step of adjusting the sensor resistance further comprises the steps of:

erasing the (n−1)th sensor resistance value; and storing a current sensor resistance value prior to step e) above.

12. A method of controlling a gas concentration sensor that generates a sensor current signal related to a detected gas concentration, comprising the steps of:

selectively changing a voltage provided to a sensor during a sensor resistance detection cycle according to a map of sensor resistance values as parameters;

monitoring a subsequent temperature associated with the sensor; and limiting a map selection range when the step of selectively changing a voltage is repeated, if an increase in temperature is detected during the step of monitoring a subsequent temperature associated with the sensor, to maintain the sensor resistance within a predetermined range.

13. A method of controlling a gas concentration sensor that generates a sensor current signal related to a detected gas concentration, comprising the steps of:

selectively changing a voltage provided to a sensor during a sensor resistance detection cycle based on a map of sensor resistance values to determine sensor resistance;

determining if a present sensor resistance is greater than or equal to a previous sensor resistance;

selecting an applied voltage map to adjust the present sensor resistance based on the step of determining to ensure that a voltage is applied to the sensor within a normal range of control.

14. A method of controlling a gas concentration sensor that generates a sensor current signal related to a detected gas concentration, comprising the steps of:

selectively changing a voltage provided to a sensor during a sensor resistance detection cycle based on a map of sensor resistance values to determine sensor resistance;

determining if a present sensor resistance is greater than or equal to a previous sensor resistance;

selecting a first applied voltage map to adjust the present sensor resistance based on the step of determining if a present sensor resistance is greater than or equal to a previous sensor resistance;

determining if conditions during the step of selecting an applied voltage map are fixed;

selecting a second applied voltage map that is available after the step of determining if conditions during the step of selecting an applied voltage map are fixed; and calculating an applied voltage based on the step of selecting a second applied voltage map to ensure that a voltage is applied to the sensor within a normal range of control.

15. The method as claimed in claim 5, wherein the resistance of the sensor is detected by selectively changing a voltage applied to the sensor and measuring a current output from the sensor in response to the applied voltage.

16. The method as claimed in claim 5, wherein the step of detecting the gas concentration based on the critical current of the sensor is concurrently executed with the step of detecting the resistance of the sensor or the step of controlling the temperature of the sensor.

* * * * *